United States Patent
Xiao et al.

(10) Patent No.: US 12,213,164 B2
(45) Date of Patent: Jan. 28, 2025

(54) DEVICE FOR SEMI-PERSISTENT CHANNEL STATE INFORMATION REFERENCE SIGNAL USE

(71) Applicant: Huawei Technologies Co., Ltd., Shenzhen (CN)

(72) Inventors: Jiehua Xiao, Shenzhen (CN); Xinxian Li, Shanghai (CN); Hao Tang, Ottawa (CA); Yi Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 264 days.

(21) Appl. No.: 17/651,181

(22) Filed: Feb. 15, 2022

(65) Prior Publication Data
US 2022/0174686 A1 Jun. 2, 2022

Related U.S. Application Data

(63) Continuation of application No. PCT/CN2019/101136, filed on Aug. 16, 2019.

(51) Int. Cl.
*H04W 72/542* (2023.01)
*H04L 1/1812* (2023.01)
*H04W 72/23* (2023.01)
*H04W 80/02* (2009.01)

(52) U.S. Cl.
CPC ......... *H04W 72/542* (2023.01); *H04L 1/1812* (2013.01); *H04W 72/23* (2023.01); *H04W 80/02* (2013.01)

(58) Field of Classification Search
CPC ... H04W 72/542; H04W 72/23; H04W 80/02; H04L 1/1812
See application file for complete search history.

(56) References Cited

U.S. PATENT DOCUMENTS

| | | | | |
|---|---|---|---|---|
| 10,849,187 | B2* | 11/2020 | Tsai | H04L 5/0092 |
| 11,259,316 | B2* | 2/2022 | Li | H04W 76/27 |
| 11,617,195 | B2* | 3/2023 | Huang | H04L 5/0048 |
| | | | | 370/329 |
| 2017/0201306 | A1* | 7/2017 | Shimezawa | H04B 7/0626 |
| 2019/0098523 | A1 | 3/2019 | Muruganathan et al. | |
| 2019/0141546 | A1* | 5/2019 | Zhou | H04L 5/001 |
| 2019/0149213 | A1* | 5/2019 | Zhou | H04L 5/001 |
| | | | | 370/329 |

(Continued)

FOREIGN PATENT DOCUMENTS

| | | |
|---|---|---|
| CN | 110035503 A | 7/2019 |
| CN | 112055374 A | 12/2020 |

(Continued)

OTHER PUBLICATIONS

Samsung, "Miscellaneous corrections", 3GPP TSG-RAN WG2 Meeting #102 R2-1808811, May 21-25, 2018, 70 pages, Busan, Korea.

(Continued)

*Primary Examiner* — Jael M Ulysse
(74) *Attorney, Agent, or Firm* — Slater Matsil, LLP

(57) ABSTRACT

This application relates to the field of communications technologies, and discloses a communication method, a communications apparatus, and a system. The method includes: A terminal device receives first information from a network device, where the first information is used to activate a first secondary cell; and the terminal device performs channel CSI measurement by using a first CSI-RS resource in a process of activating the first secondary cell.

18 Claims, 9 Drawing Sheets

(56) References Cited

U.S. PATENT DOCUMENTS

| | | | |
|---|---|---|---|
| 2019/0165847 A1* | 5/2019 | Kim | H04W 24/10 |
| 2019/0174466 A1* | 6/2019 | Zhang | H04L 5/0057 |
| 2019/0207662 A1* | 7/2019 | Zhou | H04W 72/0453 |
| 2019/0207705 A1* | 7/2019 | Zhou | H04B 17/309 |
| 2019/0207737 A1* | 7/2019 | Babaei | H04L 27/2607 |
| 2019/0208436 A1* | 7/2019 | Zhou | H04L 1/0009 |
| 2019/0215130 A1* | 7/2019 | Aiba | H04L 5/0057 |
| 2019/0253986 A1* | 8/2019 | Jeon | H04L 5/0048 |
| 2019/0349964 A1* | 11/2019 | Liou | H04B 7/0626 |
| 2020/0053777 A1* | 2/2020 | Babaei | H04W 16/14 |
| 2020/0092814 A1* | 3/2020 | Zhou | H04W 52/0235 |
| 2020/0092861 A1* | 3/2020 | Xu | H04W 72/23 |
| 2020/0092913 A1* | 3/2020 | Xu | H04W 72/0446 |
| 2020/0351066 A1* | 11/2020 | Cirik | H04L 5/0098 |
| 2020/0351129 A1* | 11/2020 | Kwak | H04W 80/02 |
| 2022/0103227 A1* | 3/2022 | Lee | H04W 76/19 |
| 2022/0174685 A1* | 6/2022 | Lee | H04B 1/74 |

FOREIGN PATENT DOCUMENTS

| | | |
|---|---|---|
| WO | 2019097482 A1 | 5/2019 |
| WO | 2019154268 A1 | 8/2019 |

OTHER PUBLICATIONS

3GPP TS 38.331 V15.6.0 (Jun. 2019), 3rd Generation Partnership Project; Technical Specification Group Radio Access Network; NR; Radio Resource Control (RRC) protocol specification(Release 15), 519 pages.

3GPP TS 38.321 V15.6.0 (Jun. 2019), 3rd Generation Partnership Project; Technical Specification Group Radio Access Network; NR; Medium Access Control (MAC) protocol specification(Release 15), 78 pages.

Ericsson, "Summary of Efficient and lowconfiguration/activation/setup", 3GPP TSG RAN WG1 Meeting #97 R1-1907681, May 13-17, 2019, 7 pages, Reno, USA.

"3rd Generation Partnership Project; Technical Specification Group Radio Access Network; NR; Multiplexing and channel coding (Release 15)," 3GPP TS 38.212 V15.6.0, Jun. 2019, 101 pages.

"3rd Generation Partnership Project; Technical Specification Group Radio Access Network; NR; Physical layer procedures for control (Release 15)," 3GPP TS 38.213 V15.6.0, Jun. 2019, 107 pages.

"3rd Generation Partnership Project; Technical Specification Group Radio Access Network; NR; Physical layer procedures for data (Release 15)," 3GPP TS 38.214 V15.6.0, Jun. 2019, 105 pages.

* cited by examiner

| | | | |
|---|---|---|---|
| $C_1$ | SP CSI-RS resource set ID 1<br>(Semi-persistent CSI-RS resource set ID 1) | R | Oct 1 |
| R | Resource set ID 1 TCI State ID 0<br>(Resource set ID 1 TCI state ID 0) | | Oct 2 |
| $C_2$ | SP CSI-RS resource set ID 2<br>(Semi-persistent CSI-RS resource set ID 2) | R | Oct 3 |
| R | Resource set ID 2 TCI State ID 0<br>(Resource set ID 2 TCI state ID 0) | | Oct 4 |

...

| | | | |
|---|---|---|---|
| $C_{16}$ | SP CSI-RS resource set ID 16<br>(Semi-persistent CSI-RS resource set ID 16) | R | |
| R | Resource set ID 16 TCI State ID 0<br>(Resource set ID 16 TCI state ID 0) | | Oct 32 |

FIG. 4

| | | | | | | | |
|---|---|---|---|---|---|---|---|
| $C_1$ | | | | | | | Oct 1 |
| | R | SP CSI-RS resource set ID 1 (Semi-persistent CSI-RS resource set ID 1) | | | | | |
| R | | Resource set ID 1 TCI State ID 0 (Resource set ID 1 TCI state ID 0) | | | | | Oct 2 |
| $C_2$ | | | | | | R | SP CSI-RS resource set ID 2 (Semi-persistent CSI-RS resource set ID 2) | Oct 3 |
| R | | Resource set ID 2 TCI State ID 0 (Resource set ID 2 TCI state ID 0) | | | | | Oct 4 |
| ... | | | | | | | |
| $C_{16}$ | | | | R | SP CSI-RS resource set ID 16 (Semi-persistent CSI-RS resource set ID 16) | | Oct 32 |
| R | | Resource set ID 16 TCI State ID 0 (Resource set ID 16 TCI state ID 0) | | | | | |
| R | | Serving Cell ID (Serving cell ID) | | | | BWP ID (Bandwidth part ID) | Oct 33 |
| R | $S_3$ | $S_2$ | $S_1$ | $S_0$ | | | Oct 34 |

FIG. 5A

DEVICE FOR SEMI-PERSISTENT CHANNEL STATE INFORMATION REFERENCE SIGNAL USE

CROSS-REFERENCE TO RELATED APPLICATIONS

This application is a continuation of International Application No. PCT/CN2019/101136, filed on Aug. 16, 2019, the disclosure of which is hereby incorporated by reference in its entirety.

TECHNICAL FIELD

This application relates to the field of communications technologies, and in particular, to a communication method, a communications apparatus, and a system.

BACKGROUND

In a wireless communications system, as a quantity of intelligent terminal users is increasing, a user service volume and a data throughput are also increasing, and further, a higher requirement is imposed on a communication bandwidth and a communication rate. Therefore, a carrier aggregation (CA) technology is introduced. An aggregated carrier includes a plurality of CCs (component carrier), and the plurality of CCs include one primary carrier and one or more secondary carriers. A plurality of continuous or discontinuous component carriers may be aggregated through carrier aggregation for use. In addition, another frequency resource, such as a bandwidth part (BWP), is also defined in a fifth-generation mobile communications radio technology (5G NR) system, to meet a requirement for flexible bandwidth usage in mobile communications, and improve utilization of discrete spectrums on a radio frequency band.

In a current carrier aggregation scenario, a downlink component carrier usually corresponds to an independent cell, a primary carrier corresponds to a primary cell, and a secondary carrier corresponds to a secondary cell. A terminal device may perform data transmission with a network device by using the primary cell, or may perform data transmission with a network device by using the secondary cell. For the terminal device, the secondary cell can be used for data transmission only after being activated. When the secondary cell is not needed for data transmission, a network side may deactivate the secondary cell by using a deactivation command.

In a conventional technology, when no BWP is activated, a terminal device activates a secondary cell by measuring a periodic channel state information-reference signal (CSI-RS) resource and reporting a valid CSI report. However, a configuration of the periodic CSI-RS resource needs to be modified through reconfiguration by scheduling slow radio resource control (RRC) signaling. To accelerate an activation process of a secondary cell and reduce an activation delay of the secondary cell, a CSI-RS periodicity for activating the secondary cell is usually configured to be relatively short. However, after the secondary cell is activated, if the CSI-RS periodicity is not modified through reconfiguration by using RRC signaling, a CSI-RS resource keeps performing transmission on an air interface based on the previously configured relatively short periodicity. As a result, CSI-RSs are still intensively transmitted on the air interface based on the relatively short periodicity, causing a waste of an air interface resource, and reducing transmission efficiency of the air interface. However, if the CSI-RS periodicity is modified through reconfiguration by using RRC signaling, a system measurement delay increases.

SUMMARY

In a conventional mechanism, a periodic CSI-RS resource is used to activate a secondary cell. As a result, if an activation delay of the secondary cell needs to be reduced, a relatively short CSI-RS periodicity needs to be configured. However, the relatively short CSI-RS periodicity causes a waste of an air interface resource after the secondary cell is activated.

In view of this, this application provides a communication method, a communications apparatus, and a system. With the method, a contradiction between the activation delay of the secondary cell and utilization of the air interface resource can be avoided.

According to a first aspect, this application provides a communication method. The method includes: A terminal device receives first information. The first information is used to activate a first secondary cell. The terminal device performs channel state information CSI measurement by using a first semi-persistent CSI-RS resource in an activation process of the first secondary cell.

In this embodiment of this application, when no BWP is activated, the terminal device may activate a secondary cell by using a semi-persistent CSI-RS resource, thereby improving utilization of the semi-persistent CSI-RS resource. An active state and a deactivated state of the semi-persistent CSI-RS resource may be set by using MAC CE signaling or DCI. Therefore, with the method, the secondary cell can be flexibly activated and deactivated.

In a possible design, the first information may include first indication information and second indication information. The first indication information is used to indicate to activate the first secondary cell. The second indication information is used to indicate to activate the first semi-persistent CSI-RS resource.

In this embodiment of this application, the first indication information and the second indication information may be carried in one piece of first control information, and the first control information may be MAC CE signaling or DCI.

In a possible design, a periodicity of the first semi-persistent CSI-RS resource that the second indication information indicates to activate is less than a periodicity of another activated semi-persistent CSI-RS resource or periodic CSI-RS resource. When the terminal device uses a semi-persistent CSI-RS resource with a relatively short configured periodicity in an activation process, activation of a secondary cell can be accelerated, and a delay required in the activation process of the first secondary cell can be reduced.

In a possible design, the first information may further include third indication information, and the third indication information is used to indicate to activate a first semi-persistent CSI report resource. The method further includes: The terminal device sends a CSI report on a primary cell or an activated secondary cell by using the first semi-persistent CSI report resource. With this design, use of a CSI report resource can be simplified, utilization of a semi-persistent CSI-RS resource can be improved, and an activation delay of a secondary cell can be reduced.

In this embodiment of this application, the terminal device determines the first secondary cell corresponding to the first indication information, and determines the first semi-persistent CSI-RS resource corresponding to the second indication information. Therefore, the terminal device activates the first secondary cell. In the activation process, the terminal device performs CSI measurement by using the first semi-persistent CSI-RS resource. The terminal device sends the CSI report on the primary cell or the activated secondary cell by using the first CSI report resource, to activate the first secondary cell.

In a possible design, the first control information is MAC CE signaling. The MAC CE signaling includes the following information fields: a secondary cell indication field and a semi-persistent CSI-RS resource set field. The secondary cell indication field is used to carry the first indication information, and the semi-persistent CSI-RS resource set field is used to carry the second indication information.

In this embodiment of this application, in an aspect, a network device may combine the first indication information and the second indication information in one piece of MAC CE signaling. Therefore, a process of using a semi-persistent CSI-RS resource in an activation process of a secondary cell can be simplified, thereby reducing an activation delay of the SCell. In another aspect, with the method, a semi-persistent CSI-RS resource can be used in an activation process of an SCell. An active state and a deactivated state of the semi-persistent CSI-RS resource may be set by using MAC CE signaling. Therefore, with the method, the secondary cell can be flexibly activated and deactivated, thereby improving utilization of an air interface resource, and also improving utilization of the semi-persistent CSI-RS resource.

In a possible design, the first control information is MAC CE signaling. The MAC CE signaling includes the following information fields: a secondary cell indication field, a semi-persistent CSI-RS resource set field, and a semi-persistent CSI report configuration field. The secondary cell indication field is used to carry the first indication information, the semi-persistent CSI-RS resource set field is used to carry the second indication information, and the semi-persistent CSI report configuration field is used to carry the third indication information.

In this embodiment of this application, in an aspect, a network device may combine the first indication information and the second indication information in one piece of MAC CE signaling, or combine the first indication information, the second indication information, and the third indication information in one piece of MAC CE signaling. Therefore, a process of using a semi-persistent CSI-RS resource in an activation process of a secondary cell can be simplified, thereby reducing an activation delay of the SCell. In another aspect, with the method, a semi-persistent CSI-RS resource and a semi-persistent CSI report resource can be used in an activation process of an SCell. An active state and a deactivated state of the semi-persistent CSI-RS resource and the semi-persistent CSI report resource may be set by using MAC CE signaling. Therefore, with the method, the secondary cell can be flexibly activated and deactivated, thereby improving utilization of an air interface resource.

In a possible design, the first information is carried in downlink control information DCI. The method further includes: The terminal device determines the first semi-persistent CSI-RS resource corresponding to a default index.

In this embodiment of this application, because a quantity of information bits in DCI is limited, in this embodiment of this application, content in the DCI for carrying the first information may be simplified in the foregoing manner.

In a possible design, the first control information is DCI. The method further includes: The terminal device determines the first secondary cell corresponding to the first indication information. The terminal device determines the first semi-persistent CSI-RS resource corresponding to the second indication information. The terminal device determines the first semi-persistent CSI report resource corresponding to the third indication information.

In this embodiment of this application, in a first aspect, a network device may combine the first indication information, the second indication information, and the third indication information in one piece of DCI. Therefore, a process of using a semi-persistent CSI-RS resource in an activation process of a secondary cell can be simplified, thereby reducing an activation delay of the SCell. In a second aspect, with the method, a semi-persistent CSI-RS resource and a semi-persistent CSI report resource can be used in an activation process of an SCell. An active state and a deactivated state of the semi-persistent CSI-RS resource and the semi-persistent CSI report resource may be set by using DCI. Therefore, with the method, the secondary cell can be flexibly activated and deactivated, thereby improving utilization of an air interface resource. In a third aspect, a transmission delay of DCI is less than that of MAC CE signaling. Therefore, with this implementation method, an activation delay of a secondary cell can be reduced more effectively.

In a possible design, a DCI format of the DCI is a DCI format 1_0. The DCI further includes an information field with a specified value. The information field with the specified value is used to indicate that the DCI is used to activate the first secondary cell.

A total quantity of bits of the DCI used to activate the first secondary cell is the same as a total quantity of bits of DCI in the DCI format 1_0 that is used to schedule downlink data.

In this embodiment of this application, an existing DCI format is reused to carry the first information, and therefore compatibility is high.

In a possible design, the terminal device sends hybrid automatic repeat request HARQ information. The HARQ information is used to indicate whether the first information is correctly received.

In a possible design, the terminal device receives second information. The second information is used to deactivate the first secondary cell. The terminal device stops performing CSI measurement by using the first semi-persistent CSI-RS resource.

According to a second aspect, this application further provides a communication method. The method includes: A network device sends first information. The first information is used to activate a first secondary cell.

The network device receives a channel state information CSI report. The CSI report is obtained by a terminal device by performing CSI measurement by using a first semi-persistent CSI-RS resource in an activation process of the first secondary cell.

In this embodiment of this application, when no BWP is activated, the terminal device may activate a secondary cell by using a semi-persistent CSI-RS resource, thereby improving utilization of the semi-persistent CSI-RS resource. An active state and a deactivated state of the semi-persistent CSI-RS resource may be set by using MAC CE signaling or DCI. Therefore, with the method, the secondary cell can be flexibly activated and deactivated.

In a possible design, the first information includes first indication information and second indication information. The first indication information is used to indicate to activate the first secondary cell. The second indication information is used to indicate to activate the first semi-persistent CSI-RS resource.

In this embodiment of this application, the first indication information and the second indication information may be carried in one piece of first control information, and the first control information may be MAC CE signaling or DCI.

In a possible design, a periodicity of the first semi-persistent CSI-RS resource that the second indication information indicates to activate is less than a periodicity of another activated semi-persistent CSI-RS resource or periodic CSI-RS resource. When the terminal device uses a semi-persistent CSI-RS resource with a relatively short configured periodicity in an activation process, activation of a secondary cell can be accelerated, and a delay required in the activation process of the first secondary cell can be reduced.

In this embodiment of this application, the terminal device determines the first secondary cell corresponding to the first indication information, and determines the first semi-persistent CSI-RS resource corresponding to the second indication information. Therefore, the terminal device activates the first secondary cell. In the activation process, the terminal device performs CSI measurement by using the first semi-persistent CSI-RS resource. The terminal device sends the CSI report on the primary cell or the activated secondary cell by using the first CSI report resource, to activate the first secondary cell.

In a possible design, the first control information is MAC CE signaling. The MAC CE signaling includes the following information fields: a secondary cell indication field and a semi-persistent CSI-RS resource set field. The secondary cell indication field is used to carry the first indication information, and the semi-persistent CSI-RS resource set field is used to carry the second indication information.

In this embodiment of this application, in an aspect, the network device may combine the first indication information and the second indication information in one piece of MAC CE signaling. Therefore, a process of using a semi-persistent CSI-RS resource in an activation process of a secondary cell can be simplified, thereby reducing an activation delay of the SCell. In another aspect, with the method, a semi-persistent CSI-RS resource can be used in an activation process of an SCell. An active state and a deactivated state of the semi-persistent CSI-RS resource may be set by using MAC CE signaling. Therefore, with the method, the secondary cell can be flexibly activated and deactivated, thereby improving utilization of an air interface resource, and also improving utilization of the semi-persistent CSI-RS resource.

In a possible design, the first control information is MAC CE signaling. The MAC CE signaling includes the following information fields: a secondary cell indication field, a semi-persistent CSI-RS resource set field, and a semi-persistent CSI report configuration field. The secondary cell indication field is used to carry the first indication information, the semi-persistent CSI-RS resource set field is used to carry the second indication information, and the semi-persistent CSI report configuration field is used to carry the third indication information.

In this embodiment of this application, in an aspect, the network device may combine the first indication information and the second indication information in one piece of MAC CE signaling, or combine the first indication information, the second indication information, and the third indication information in one piece of MAC CE signaling. Therefore, a process of using a semi-persistent CSI-RS resource in an activation process of a secondary cell can be simplified, thereby reducing an activation delay of the SCell. In another aspect, with the method, a semi-persistent CSI-RS resource and a semi-persistent CSI report resource can be used in an activation process of an SCell. An active state and a deactivated state of the semi-persistent CSI-RS resource and the semi-persistent CSI report resource may be set by using MAC CE signaling. Therefore, with the method, the secondary cell can be flexibly activated and deactivated, thereby improving utilization of an air interface resource.

In a possible design, the first information is carried in downlink control information DCI, and the first semi-persistent CSI-RS resource is a semi-persistent CSI-RS resource corresponding to a default index.

In this embodiment of this application, because a quantity of information bits in DCI is limited, in this embodiment of this application, content in the DCI for carrying the first information may be simplified in the foregoing manner.

In a possible design, the first secondary cell is determined by the terminal device based on the first indication information, the first semi-persistent CSI-RS resource is determined based on the second indication information, and the first semi-persistent CSI report resource is determined based on the third indication information.

In this embodiment of this application, in a first aspect, the network device may combine the first indication information, the second indication information, and the third indication information in one piece of DCI. Therefore, a process of using a semi-persistent CSI-RS resource in an activation process of a secondary cell can be simplified, thereby reducing an activation delay of the SCell. In a second aspect, with the method, a semi-persistent CSI-RS resource and a semi-persistent CSI report resource can be used in an activation process of an SCell. An active state and a deactivated state of the semi-persistent CSI-RS resource and the semi-persistent CSI report resource may be set by using DCI. Therefore, with the method, the secondary cell can be flexibly activated and deactivated, thereby improving utilization of an air interface resource. In a third aspect, a transmission delay of DCI is less than that of MAC CE signaling. Therefore, with this implementation method, an activation delay of a secondary cell can be reduced more effectively.

In a possible design, a DCI format of the DCI is a DCI format 1_0. The DCI further includes an information field with a specified value. The information field with the specified value is used to indicate that the DCI is used to activate the first secondary cell. A total quantity of bits of the DCI used to activate the first secondary cell is the same as a total quantity of bits of DCI in the DCI format 1_0 that is used to schedule downlink data.

In this embodiment of this application, an existing DCI format is reused to carry the first information, and therefore compatibility is high.

In a possible design, the terminal device sends hybrid automatic repeat request HARQ information. The HARQ information is used to indicate whether the first information is correctly received.

In a possible design, the network device sends second information. The second information is used to deactivate the first secondary cell.

According to a third aspect, an embodiment of this application provides an apparatus. In a possible design, the apparatus includes one or more processors and a communications unit. The one or more processors are configured to support the apparatus in performing corresponding functions of the network device in the foregoing methods, for example, generating the first indication information. The communications unit is configured to support the apparatus in communicating with another device, to implement a receiving function and/or a sending function, for example, sending the first indication information.

Optionally, the apparatus may further include one or more memories. The memory is configured to be coupled to the processor, and the memory stores program instructions and/or data that are/is necessary for a network device. The one or more memories may be integrated with the processor, or may be disposed independent of the processor. This is not limited in this application.

The apparatus may be a base station, a gNB, a TRP, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver to receive and send a signal, and the memory is configured to store a computer program. The processor is configured to run the computer program in the memory, so that the apparatus performs the method performed by the network device in any one of the second aspect or the possible implementations of the second aspect.

In a possible design, the apparatus includes one or more processors and a communications unit. The one or more processors are configured to support the apparatus in performing corresponding functions of the terminal device in the foregoing methods, for example, determining a second parameter. The communications unit is configured to support the apparatus in communicating with another device, to implement a receiving function and/or a sending function, for example, receiving the first indication information.

Optionally, the apparatus may further include one or more memories. The memory is configured to be coupled to the processor, and the memory stores program instructions and/or data that are/is necessary for the apparatus. The one or more memories may be integrated with the processor, or may be disposed independent of the processor. This is not limited in this application.

The apparatus may be an intelligent terminal, a wearable device, or the like. The communications unit may be a transceiver or a transceiver circuit. Optionally, the transceiver may alternatively be an input/output circuit or an interface.

The apparatus may alternatively be a communications chip. The communications unit may be an input/output circuit or an interface of the communications chip.

In another possible design, the apparatus includes a transceiver, a processor, and a memory. The processor is configured to control the transceiver to receive and send a signal, and the memory is configured to store a computer program. The processor is configured to run the computer program in the memory, so that the apparatus performs the method performed by the terminal device in any one of the first aspect or the possible implementations of the first aspect.

According to a fourth aspect, a system is provided. The system includes the foregoing terminal device and network device.

According to a fifth aspect, a computer-readable storage medium is provided and is configured to store a computer program. The computer program includes instructions used to perform the method according to any one of the first aspect or the possible implementations of the first aspect.

According to a sixth aspect, a computer-readable storage medium is provided and is configured to store a computer program. The computer program includes instructions used to perform the method according to any one of the second aspect or the possible implementations of the second aspect.

According to a seventh aspect, a computer program product is provided. The computer program product includes computer program code. When the computer program code is run on a computer, the computer is enabled to perform the method according to any one of the first aspect or the possible implementations of the first aspect.

According to an eighth aspect, a computer program product is provided. The computer program product includes computer program code. When the computer program code is run on a computer, the computer is enabled to perform the method according to any one of the second aspect or the possible implementations of the second aspect.

According to the method provided in the embodiments of this application, a power and/or power headroom determining method applicable to a multi-beam scenario may be provided, and is applicable to power control or power headroom reporting in the multi-beam scenario, for example, applicable to power control or power headroom reporting in an NR system.

BRIEF DESCRIPTION OF THE DRAWINGS

FIG. 4 shows a structure of MAC CE signaling according to an embodiment of this application;

FIG. 5A shows another structure of MAC CE signaling according to an embodiment of this application;

DETAILED DESCRIPTION OF ILLUSTRATIVE EMBODIMENTS

Figure 1A:
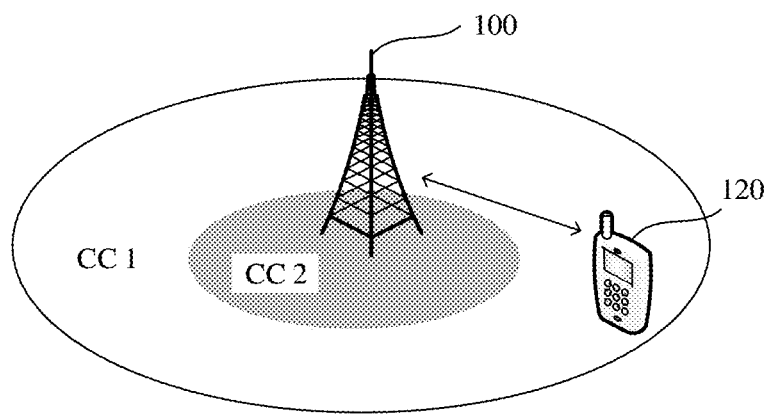
FIG. 1A and FIG. 1B are schematic diagrams of a possible network architecture according to an embodiment of this application.

The following describes the technical solutions in embodiments of this application with reference to the accompanying drawings in the embodiments of this application.

The technical solutions in the embodiments of this application may be applied to various communications systems, for example, a long term evolution (LTE) system, a worldwide interoperability for microwave access (WiMAX) communications system, a future 5th generation (5G) system such as a new radio access technology (NR), and a future communications system such as a 6G system.

Various aspects, embodiments, or features are presented in this application by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the term "for example" in the embodiments of this application is used to represent giving an example, an illustration, or a description. Any embodiment or design scheme described as an "example" in this application should not be explained as being more preferred or having more advantages than another embodiment or design scheme. Exactly, the word "example" is used to present a concept in a specific manner.

In the embodiments of this application, information, a signal, a message, or a channel may be interchangeably used sometimes. It should be noted that the meanings to be expressed are consistent when differences are not emphasized. The terms "of", "relevant (corresponding)", and "corresponding" may be interchangeably used sometimes. It should be noted that the meanings to be expressed are consistent when differences are not emphasized.

It should be understood that the character "/" in this specification generally indicates an "or" relationship between the associated objects, but may also indicate an "and/or" relationship. For details, refer to a context for understanding.

In this application, "at least one" refers to one or more, and "a plurality of" refers to two or more. The term "at least one of the following" or a similar expression thereof means any combination of these items, including a singular item or any combination of plural items.

A network architecture and a service scenario described in the embodiments of this application are intended to describe the technical solutions in the embodiments of this application more clearly, and do not constitute any limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

The embodiments of this application may be applied to a time division duplex (TDD) scenario, or may be applied to a frequency division duplex (FDD) scenario.

The embodiments of this application may be applied to a conventional typical network or a future UE-centric network. A non-cell network architecture is introduced to the UE-centric network. To be specific, a large quantity of small cells are deployed in a specific area to form a hyper cell, and each small cell is a transmission point (TP) or a TRP of the hyper cell, and is connected to a centralized controller. When the UE moves in the hyper cell, a network side device selects a new sub-cluster for the UE in real time to serve the UE, to avoid a real cell handover, and implement UE service continuity. The network side device includes a radio network device.

In the embodiments of this application, an NR network scenario in a wireless communication network is used as an example to describe some scenarios. It should be noted that the solutions in the embodiments of this application may be further applied to another wireless communication network, and a corresponding name may also be replaced with a name of a corresponding function in the another wireless communication network.

For ease of understanding the embodiments of this application, a communications system shown in FIG. 1A is first used as an example to describe in detail a communications system used in the embodiments of this application. FIG. 1A is a schematic diagram of a communications system used in a communication method according to an embodiment of this application. To make objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two.

FIG. 1A is a schematic diagram of a network architecture in a carrier aggregation scenario to which this application is applicable. The network architecture includes a network device 100, a terminal device 120, and two downlink component carriers: a CC 1 and a CC 2. The CC 1 and the CC 2 of the network device 100 operate at different frequencies.

The terminal device 120 may be a wireless terminal device that can receive scheduling and indication information of a network device. The wireless terminal device may be a device that provides a user with voice and/or data connectivity, a handheld device with a wireless connection function, or another processing device connected to a wireless modem. The terminal device may communicate with one or more core networks or the internet through a radio access network (RAN). The terminal device may be a mobile terminal device, such as a mobile phone (or referred to as a "cellular" phone or a mobile phone), a computer, and a data card, for example, may be a portable, pocket-sized, handheld, computer built-in, or in-vehicle mobile apparatus that exchanges language and/or data with the radio access network. For example, the device may include a personal communications service (PCS) phone, a cordless phone, a session initiation protocol (SIP) phone, a wireless local loop (WLL) station, a personal digital assistant (PDA), a tablet computer (Pad), and a computer having a wireless transceiver function. The wireless terminal device may also be referred to as a system, a subscriber unit, a mobile station (MS), a remote station, an access point (AP), a remote terminal device, an access terminal device, a user terminal device, a user agent, a subscriber station (SS), customer premises equipment (CPE), a terminal, user equipment (UE), a mobile terminal (MT), or the like. Alternatively, the terminal device may be a wearable device and a terminal device in a next-generation communications system such as a 5G network, a terminal device in a future evolved public land mobile network (PLMN), a terminal device in an NR communications system, or the like.

The network device (for example, a macro base station) 100 is a network-side entity configured to transmit or receive a signal. The network device may be a device configured to communicate with a mobile device. The network device may be an AP in a wireless local area network (WLAN), or may be an evolved NodeB (eNB or eNodeB) in long term evolution (LTE), a relay station, an access point, a vehicle-mounted device, a wearable device, a network device in a future 5G network, a network device in a future evolved public land mobile network (PLMN), a new generation NodeB (gNodeB) in an NR system, or the like.

In addition, in the embodiments of this application, the network device serves a cell, and the terminal device communicates with the network device by using a communication resource (for example, a frequency domain resource, namely, a spectrum resource) used for the cell. The cell may be a cell corresponding to the network device (for example, a base station). The cell may belong to a macro base station, or may belong to a base station corresponding to a small cell. The small cell herein may include a metro cell, a micro cell, a pico cell, a femto cell, and the like. These small cells have features of small coverage and low transmit power, and are applicable to providing high-rate data sending service. In addition, in another possible case, the network device may be another apparatus that provides a wireless communication function for the terminal device. A specific technology and a specific device form that are used by the network device are not limited in the embodiments of this application. For ease of description, in the embodiments of this application, the apparatus that provides the wireless communication function for the terminal device is referred to as the network device.

Figure 1B:
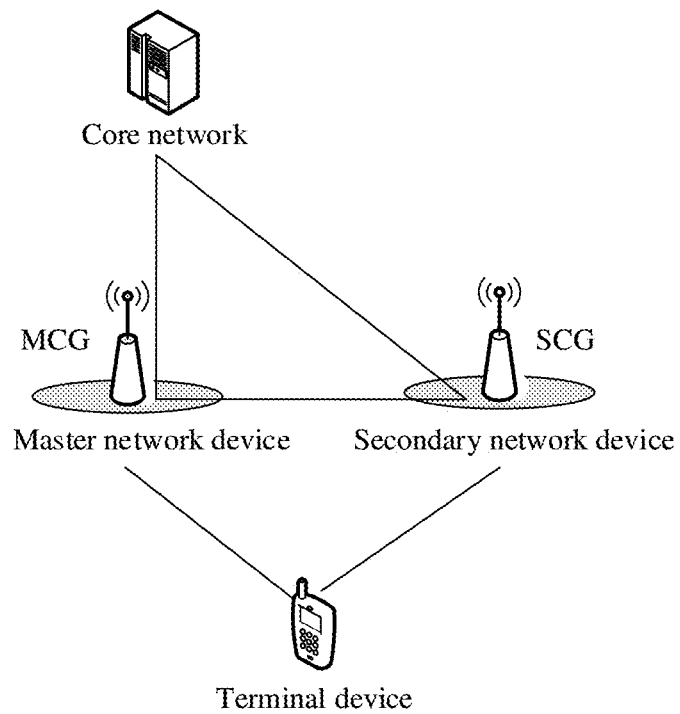

FIG. 1B is a schematic diagram of a network architecture in a dual connectivity (DC) scenario to which this application is applicable. The architecture includes two cell groups: a master cell group (MCG) and a secondary cell group (SCG). The MCG includes a primary cell (PCell), or additionally includes one or more secondary cells (SCell). The SCG includes a primary secondary cell (PSCell), or additionally includes one or more SCells. A network device that manages the MCG is referred to as a master network device or a master node. A network device that manages the SCG is referred to as a secondary network device or a secondary node.

During deployment of a 5G network, a 5G cell may serve as a macro cell (a master network device) for networking, or may serve as a small cell (a secondary network device) to enhance coverage and a capacity of an existing LTE network. Regardless of which networking mode is used, a dual connectivity technology may be used to interconnect LTE and 5G systems, to improve radio resource utilization of an entire mobile network system, reduce a system handover delay, and improve user and system performance.

In this embodiment of this application, the master network device may be one of an LTE network device (for example, an eNB), a 5G network device (for example, a gNB), or a future communications network device, and the secondary network device is also one of an LTE network device, a 5G network device, or a future communications network device. In addition, the master network device and the secondary network device may be network devices of a same standard, for example, both are eNBs; or may be network devices of different standards, for example, the master network device is an eNB, and the secondary network device is a gNB. Communication standards of the master network device and the secondary network device are not limited in this application.

It should be understood that FIG. 1A and FIG. 1B are only example simplified schematic diagrams for ease of understanding. The communications system may further include another network device or another terminal device not shown in FIG. 1A and FIG. 1B.

The following explains and describes some communication nouns or terms used in this application. The communication nouns or the terms are also used as a part of the invention content of this application.

1. Carrier Aggregation (CA)

Carrier aggregation means that two or more component carriers (CC) are aggregated to support a higher transmission bandwidth.

One downlink component carrier corresponds to one independent cell. Usually, one downlink component carrier is equivalent to one cell. One cell may include one downlink carrier and one uplink carrier, or only one downlink carrier. In a TDD duplex mode, the downlink carrier and the uplink carrier are on one carrier. To efficiently utilize fragmented spectrums, carrier aggregation supports aggregation of different component carriers. The different component carriers described herein may be component carriers with a same bandwidth or different bandwidths, or adjacent or non-adjacent component carriers in a same frequency band, or may be component carriers in different frequency bands. Based on this, carrier aggregation may be classified into intra-band continuous carrier aggregation, intra-band discontinuous carrier aggregation, and inter-band discontinuous carrier aggregation.

A component carrier corresponding to a primary cell (PCell) is referred to as a primary component carrier (PCC). A downlink carrier of the PCell is referred to as a DL PCC, and an uplink carrier of the PCell is referred to as a UL PCC. The PCell may be a cell to which a terminal device is initially connected, or a cell to which an RRC connection is re-established, or may be a primary cell specified in a cell handover process. The PCell is responsible for RRC communication with the terminal device.

A component carrier corresponding to an SCell (secondary cell) is referred to as a secondary carrier (SCC). A downlink carrier of the SCell is referred to as a DL SCC, and an uplink carrier of the SCell is referred to as a UL SCC. The SCell is added during RRC connection reconfiguration and is used to provide an additional radio resource. The SCell may be added/modified/released through an RRC connection reconfiguration message after an initial security activation procedure. There is no RRC communication between the SCell and the terminal device.

A serving cell is a cell that provides service (uplink and downlink transmission) for the terminal device. If the terminal device is in an RRC connected (RRC_CONNECTED) state but no CA is configured, the terminal device has only one serving cell, that is, a PCell. If the terminal device is in an RRC_CONNECTED state and a CA is configured, a serving cell of the terminal device includes a PCell and all SCells. In other words, the serving cell may refer to either a PCell or an SCell. Both the PCell and the SCell are serving cells.

2. Dual Connectivity (DC)

Dual connectivity means that at least two carriers used for aggregation are on different base stations.

A primary base station has at least one carrier: a primary cell. A secondary base station also has at least one carrier: a primary secondary cell. The primary base station and the secondary base station may further have another secondary carrier. A terminal device may communicate with a network by using the primary base station and the secondary base station.

3. Primary Cell (PCell)

A primary cell may be a cell to which a terminal device establishes an initial connection, or a primary cell may be a cell to which a terminal device re-establishes a radio resource control (RRC) connection, or a primary cell may be a primary cell specified in a handover process, or the like. The primary cell is mainly used for RRC communication with the terminal device. A component carrier corresponding to the primary cell is referred to as a primary component carrier (PCC). A downlink carrier of the primary component carrier is referred to as a downlink primary component carrier (DL PCC). An uplink carrier of the primary component carrier is referred to as an uplink primary component carrier (UL PCC). The primary component carrier may also be referred to as a primary carrier. In this embodiment of this application, the primary carrier is used as an example for description.

4. Secondary Cell (SCell)

A secondary cell is mainly used to provide additional radio resources. For example, no RRC communication is performed between the secondary cell and UE. The secondary cell may be added during RRC reconfiguration. A component carrier corresponding to the secondary cell is referred to as a secondary component carrier (SCC). A downlink carrier of the secondary component carrier is referred to as a downlink secondary component carrier (DL SCC). An uplink carrier of the secondary component carrier is referred to as an uplink secondary component carrier (UL SCC). The secondary component carrier may also be referred to as a secondary carrier. In this embodiment of this application, the secondary carrier is used as an example for description.

For example, a primary cell may be determined when a connection is established, and a secondary cell may be added, modified, or released by using an RRC connection reconfiguration message after initial access is completed.

5. Activation and Deactivation of a Secondary Cell

A primary cell of a terminal device cannot be activated or deactivated, and the primary cell of the terminal device is always in an active state. Except for a PCell, a configured SCell cannot be used immediately after being configured. To better manage battery consumption of a terminal device configured with a CA, a communications system provides an activation/deactivation mechanism for an SCell. To activate an SCell, CSI measurement needs to be performed, and a valid CSI report needs to be reported.

For example, if a secondary cell is activated, the terminal device may perform one or more of the following operations on a component carrier corresponding to the activated secondary cell: sending a sounding reference signal (SRS); reporting channel state information (CSI); detecting the secondary cell and a physical downlink control channel (PDCCH) transmitted on the secondary cell; if a physical uplink control channel (PUCCH) to be transmitted on the carrier is configured, sending the PUCCH; starting or restarting a secondary cell deactivation timer (SCell deactivation timer); triggering reporting of a power headroom report (PHR); and the like.

If a secondary cell is deactivated, the terminal device may performing at least the following operations on a component carrier corresponding to the deactivated secondary cell: skipping sending an SRS; skipping reporting CSI; skipping transmitting uplink data, which may include an uplink synchronization channel (UL-SCH), a random access channel (RACH), and the like; skipping detecting the secondary cell and a PDCCH transmitted on the secondary cell; skipping sending a PUCCH; and the like.

A BWP is configured on a cell. Therefore, before a secondary cell is activated, all BWPs configured on the secondary cell are in an inactive state. All the foregoing cell activation operations are performed after a BWP is activated. When a secondary cell is activated, at least one BWP is also activated.

6. Bandwidth Part (BWP)

A BWP is a group of continuous or discontinuous physical resources on a carrier. The physical resource may be a physical resource block (RB), a physical resource block group (RBG), a physical resource element (RE), or the like. A network device may configure one or more BWPs on a cell for a terminal device. At any moment, the terminal device may activate one or more BWPs, and the terminal device and the network device send and receive data on the activated BWPs. The BWPs may include an initial active BWP and a UE-specific BWP. On a secondary carrier, a first active BWP may be further included.

The initial active BWP may be a BWP used by the terminal device to send or receive data before dedicated BWP configuration information is received, and may be configured by using a broadcast message. The broadcast message may include a master information block (MIB), a system information block (SIB), and the like. Alternatively, the initial active BWP may be a BWP used for initial access, or the like. The initial active BWP may include an initial active downlink BWP (initial downlink BWP), an initial active uplink BWP (initial uplink BWP), and the like.

The UE-specific BWP is a BWP used by the terminal device to send or receive data after initial access is completed and the dedicated BWP configuration information is received. For example, the dedicated BWP configuration information may be RRC. For a terminal, for example, four BWPs may be configured on a serving cell, and the four BWPs may not include an initial active BWP configured by using a broadcast message. At any moment, one or more BWPs may be activated, and an activated BWP may be referred to as an active BWP.

For example, the network device may send downlink control information (DCI) to the terminal device. The DCI may be used to indicate that a BWP is activated. The activated BWP may be the UE-specific BWP. The network device and the terminal device may communicate with each other on the activated BWP, to transmit an ultra reliable and low latency communications (URLLC) service, an enhanced mobile broadband (eMBB) service, a vehicle to everything (V2X) service, machine-type communication (MTC) positioning, or the like. Alternatively, the BWP may be a service-specific BWP, for example, a sidelink BWP used only for the V2X service.

7. Media Access Control Control Element (MAC CE)

MAC CE signaling is control information exchanged between a network device and a terminal device at a MAC layer. Existing secondary cell activation and deactivation commands are indicated by sending, by the network device, activation and deactivation MAC CEs to the terminal device. For an SCell that has been configured but has not been activated, the terminal device may activate the SCell based on information in the MAC CE. Further, for an activated SCell, the network device may deactivate one or more activated SCells by using the MAC CE. In addition, the terminal device may further deactivate an SCell based on a deactivation timer mechanism of the SCell.

8. Downlink Control Information (DCI)

DCI is information sent by a network device to a terminal device. For example, the network device may send the DCI by using a physical downlink control channel PDCCH. The DCI may be used to schedule uplink data transmission, schedule downlink data transmission, or the like. For example, a communications interface between the network device and the terminal device is an air interface (a Uu interface), and uplink and downlink data transmission may be performed on the Uu interface. The uplink data transmission is data transmission from the terminal device to the network device. The downlink data transmission is data transmission from the network device to the terminal device.

9. CSI-RS Resources and CSI Report Resource

There are three types of CSI-RS resources: a periodic CSI-RS resource, a semi-persistent CSI-RS (SP CSI-RS) resource, and an aperiodic CSI-RS resource. There are also three types of CSI report resources: a periodic CSI report resource, a semi-persistent CSI report (SP CSI report) resource, and an aperiodic CSI report resource.

An active state or a deactivated state of the semi-persistent CSI-RS resource and the semi-persistent CSI report resource may be indicated by using MAC CE signaling, and the periodic CSI-RS resource can be modified only by using RRC signaling. Activation means that configured information takes effect. Deactivation means that related configuration information becomes invalid. For example, a transmission interval is first configured for the semi-persistent CSI-RS resource. However, before the semi-persistent CSI-RS resource is activated by using a MAC CE, the semi-persistent CSI-RS resource is in a deactivated state (which may also be referred to as an inactive state), and is not actually used to send a CSI-RS. A network side sends a CSI-RS based on the configured transmission interval only after the semi-persistent CSI-RS resource is activated by using a MAC CE. Correspondingly, when the semi-persistent CSI-RS resource is in an active state, after the network side deactivates the semi-persistent CSI-RS resource by using a MAC CE, the network side stops sending a CSI-RS.

It can be understood that, because one cell includes only one downlink carrier, and the downlink carrier is an indispensable carrier of the cell, a "cell" and a "carrier" in the embodiments of this application may be used equivalently. In the embodiments of this application, the "cell" is used as an example for description, unless otherwise specified. In addition, in the descriptions of this application, terms such as "first" and "second" are merely used for distinction and description, and shall not be understood as an indication or implication of relative importance or an indication or implication of an order.

Figure 2:
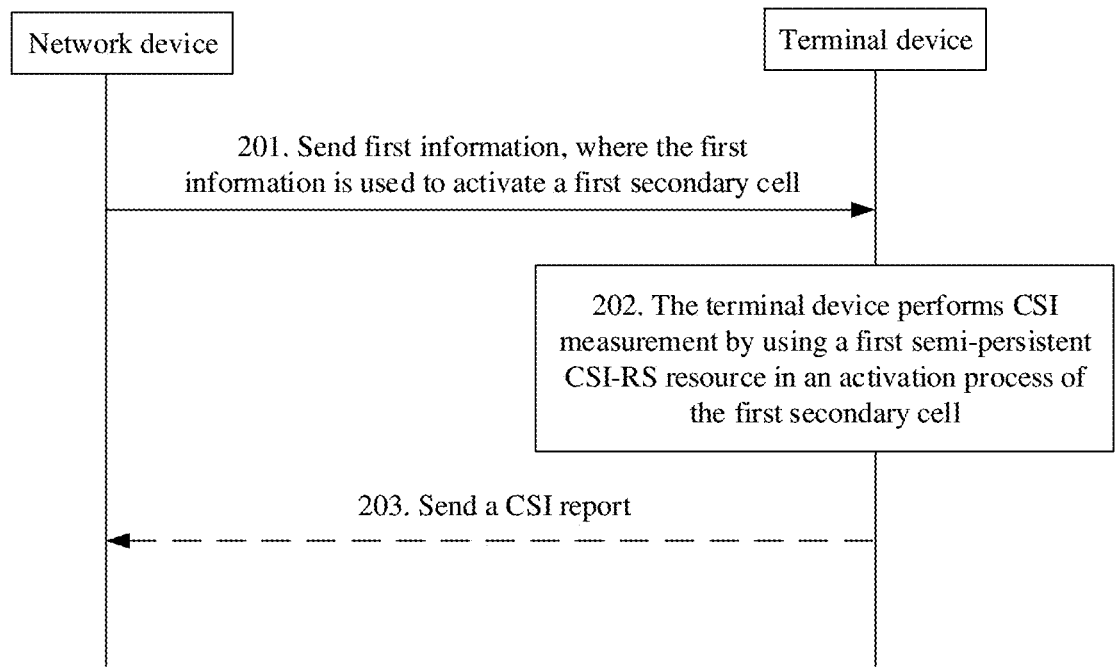
FIG. 2 is a schematic flowchart of a communication method according to an embodiment of this application.

As shown in FIG. 2, this application provides a procedure of a communication method. The procedure is used to activate a secondary cell. In the procedure, a network device may be the network device 100 in FIG. 1A, and the terminal device may be the terminal device 120 in FIG. 1A. It can be understood that a function of the network device may alternatively be implemented by a chip applied to the network device, or implemented by the network device with support by another apparatus; and a function of the terminal device may alternatively be implemented by a chip applied to the terminal device, or implemented by the terminal device with support by another apparatus. The procedure may be specifically as follows:

Step 201: The network device sends first information to the terminal device, where the first information is used to activate a first secondary cell.

The first information may be carried in control information. For example, the control information is MAC CE signaling or DCI. The MAC CE signaling or the DCI includes first indication information. The first indication information is used to indicate to activate the first secondary cell.

Step 202: The terminal device receives the first information, and performs CSI measurement by using a first semi-persistent CSI-RS resource in an activation process of the first secondary cell.

Optionally, step 203 may be further included: The terminal device sends a CSI report to the network device.

For example, the control information may include an activation command for one or more cells, and the control information may also include a deactivation command for one or more cells, that is, the control information may include both one or more cell activation commands and one or more cell deactivation commands. In the following descriptions of this embodiment of this application, activation of one secondary cell (that is, the first secondary cell) is used as an example. When the control information further includes an activation command or a deactivation command for another secondary cell, an activation process or a deactivation process of the another secondary cell is similar to that of the first secondary cell, and descriptions are not repeated.

For example, when the foregoing method is applied to the communications system in the DC scenario shown in FIG. 1B, because the PCell on the master network device is used for RRC control signaling interaction between the terminal device side and the network device side, the master network device may obtain all cell configuration information, for example, configuration information of a secondary cell on the secondary network device. Therefore, when the secondary network device needs the configuration information of the secondary cell, the secondary network device may request to obtain the configuration information from the master network device, or the master network device actively sends the configuration information to the secondary network device. The configuration information of the secondary cell includes information about a semi-persistent CSI-RS resource, and further includes information about a semi-persistent CSI report resource, and the like.

According to the foregoing solution, when no BWP is activated, the terminal device may activate a secondary cell by using a semi-persistent CSI-RS resource, thereby improving utilization of the semi-persistent CSI-RS resource. An active and a deactivated state of the semi-persistent CSI-RS resource may be set by using MAC CE signaling or DCI. Therefore, with the method, the secondary cell can be flexibly activated and deactivated.

Various cases of the embodiment shown in FIG. 2 are described below.

Case 1: In addition to the first indication information, the first information may further include second indication information. The second indication information is used to indicate to activate the first semi-persistent CSI-RS resource.

Case 1 further includes Case 1.1 and Case 1.2.

Case 1.1: The first indication information may be carried in MAC CE signaling or DCI, and the second indication information may be carried in another piece of MAC CE signaling or DCI.

Case 1.2: The first indication information and the second indication information may be carried in one piece of first control information, and the first control information may be MAC CE signaling or DCI.

In Case 1, step 202 is specifically as follows: The terminal device determines the first secondary cell corresponding to the first indication information, and determines the first semi-persistent CSI-RS resource corresponding to the second indication information. Therefore, the terminal device activates the first secondary cell. In the activation process, the terminal device performs CSI measurement by using the first semi-persistent CSI-RS resource.

In Case 1, step 203 is specifically as follows: The terminal device sends the CSI report on a primary cell or an activated secondary cell by using an existing configured CSI report resource.

In a possible example, a periodicity of the first semi-persistent CSI-RS resource that the second indication information indicates to activate is less than a periodicity of another activated semi-persistent CSI-RS resource or periodic CSI-RS resource. When the terminal device uses a semi-persistent CSI-RS resource with a relatively short configured periodicity in an activation process, activation of a secondary cell can be accelerated, use of a semi-persistent CSI-RS resource can be simplified, utilization of the semi-persistent CSI-RS resource can be improved, and an activation delay of the secondary cell can be reduced.

Case 2: In addition to the first indication information and the second indication information, the first information further includes third indication information. The third indication information is used to indicate to activate a first semi-persistent CSI report resource.

Case 2 further includes Case 2.1 to Case 2.3.

Case 2.1: The first indication information may be carried in first MAC CE signaling or first DCI, the second indication information may be carried in second MAC CE signaling or second DCI, and the third indication information may be carried in third MAC CE signaling or third DCI.

Case 2.2: Any two of the first indication information, the second indication information, and the third indication information are carried in one piece of MAC CE signaling or DCI, and the remaining indication information may be carried in another piece of MAC CE signaling or DCI.

Case 2.3: The first indication information, the second indication information, and the third indication information may all be carried in first control information, and the first control information may be MAC CE signaling or DCI.

In Case 2, step 202 is specifically as follows: The terminal device determines the first secondary cell corresponding to the first indication information, and determines the first semi-persistent CSI-RS resource corresponding to the second indication information. Therefore, the terminal device activates the first secondary cell. In the activation process, the terminal device performs CSI measurement by using the first semi-persistent CSI-RS resource.

In Case 2, step 203 is specifically as follows: The terminal device determines the first CSI report resource corresponding to the third indication information. Then the terminal device sends the CSI report on a primary cell or an activated secondary cell by using the first CSI report resource.

In a possible example, a periodicity of the first CSI report resource that the third indication information indicates to activate is less than a periodicity of another activated semi-persistent CSI report resource or periodic CSI report resource. When the terminal device uses a semi-persistent CSI report resource with a relatively short configured periodicity in an activation process, activation of a secondary cell can be accelerated, and a delay required in the activation process of the first secondary cell can be reduced.

Case 3: The first information includes only the first indication information. The first indication information may be carried in DCI.

Case 3 further includes Case 3.1 and Case 3.2.

Case 3.1: Step 202 is specifically as follows: After receiving the DCI, the terminal device determines the first secondary cell corresponding to the first indication information. In addition, the terminal device determines the first semi-persistent CSI-RS resource corresponding to a default index. Therefore, the terminal device activates the first secondary cell. In the activation process, the terminal device performs CSI measurement by using the first semi-persistent CSI-RS resource.

Step 203 is specifically as follows: The terminal device sends the CSI report on a primary cell or an activated secondary cell by using an existing configured CSI report resource.

Case 3.2: Step 202 is specifically as follows: After receiving the DCI, the terminal device determines the first secondary cell corresponding to the first indication information. In addition, the terminal device determines the first semi-persistent CSI-RS resource and the first semi-persistent CSI report resource that correspond to the default index. Therefore, the terminal device activates the first secondary cell. In the activation process, the terminal device performs CSI measurement by using the first semi-persistent CSI-RS resource.

Step 203 is specifically as follows: The terminal device sends the CSI report on a primary cell or an activated secondary cell by using the first semi-persistent CSI report resource.

For the communication method shown in FIG. 2, in an example, four different specific implementation methods are provided below. Implementation Method 1 is a specific implementation process of Case 1.2. Implementation Method 2 is a specific implementation process of Case 2.3. Implementation Method 3 and Implementation Method 4 are specific implementation processes of Case 3.2. In the following embodiments of the present invention, an example in which aggregation of a maximum of 16 cells is supported is used. A specific quantity of supported cells may be adjusted as required, and this does not constitute a limitation to the present invention. It should be noted that actual application is not limited to the following four implementation methods.

Implementation Method 1

Figure 3:
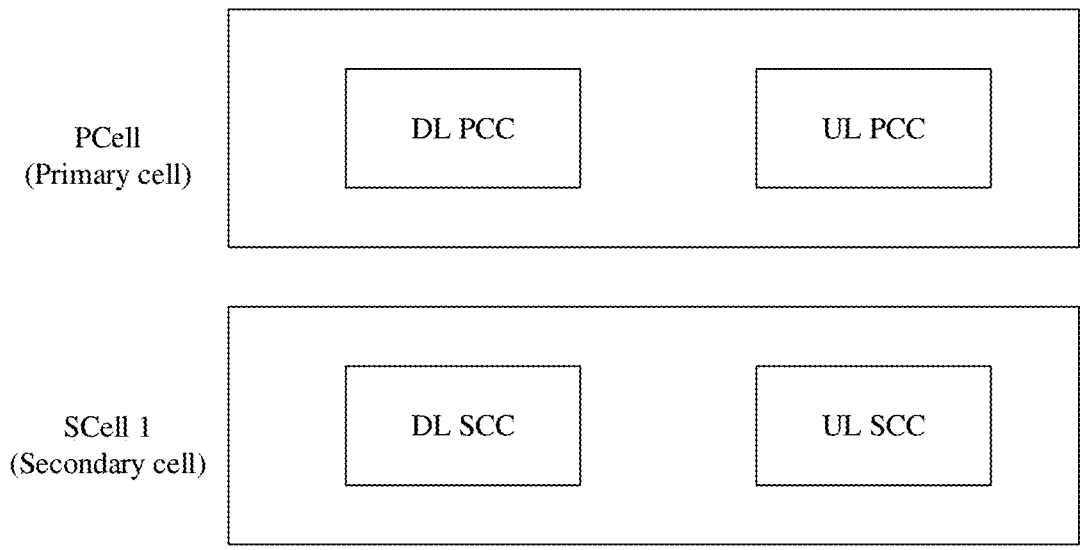
FIG. 3 is a schematic diagram of a relationship between a carrier and a cell in a CA scenario according to an embodiment of this application.

For example, as shown in FIG. 3, an SCell 1 is the to-be-activated first secondary cell, and the first semi-persistent CSI-RS resource is a resource on a DL SCC. After receiving an activation command for the SCell 1, the terminal device performs CSI measurement by using the first semi-persistent CSI-RS resource on the DL SCC of the SCell 1. Then the terminal device sends a CSI report by using a CSI report resource on a UL CC of a PCell.

In a possible example, in step 201, the first information sent by the network device to the terminal device is carried in MAC CE signaling, and the MAC CE signaling includes the first indication information and the second indication information.

A MAC CE structure is shown in FIG. 4. In FIG. 4, information fields in a MAC CE include a secondary cell indication field, a semi-persistent CSI-RS resource set field, a resource set TCI state field, and a reserved field. Meanings of the Information Fields are as Follows.

(1) Ci indicates the secondary cell indication field, and is used to indicate an activation/deactivation status of an SCell whose index number field (SCell Index) is configured as i. If Ci is set to 1, it indicates that the corresponding SCell is activated. If Ci is set to 0, it indicates that the corresponding SCell is deactivated. In FIG. 4, Oct indicates that an octet is used in an Internet standard, that is, 1 octet=8 bits. If no secondary cell with the corresponding index number field is configured, content of this field is ignored.

(2) Semi-persistent CSI-RS resource set ID i (namely, SP CSI-RS resource set ID i) indicates the semi-persistent CSI-RS resource set field. This field includes an index of a CSI-RS resource set (which may also be referred to as a CSI-RS resource set) that includes one or more semi-consistent CSI-RS resources. The CSI-RS resource herein may be a non-zero power channel state information-reference signal resource (NZP CSI-RS resource). Therefore, the semi-persistent CSI-RS resource set ID may be an index (ID) of an NZP-CSI-RS-ResourceSet of NZP CSI-RS resources, and is used to indicate that a resource set corresponding to the index of the ResourceSet on a specific cell should be activated or deactivated. A field length of this information field is 6 bits (currently, a maximum of 64 CSI-RS resource sets can be configured for a cell). When Ci is set to 1, it indicates that a semi-persistent CSI-RS resource set corresponding to the SP CSI-RS resource set ID i on a cell corresponding to Ci is activated; otherwise, it indicates that a semi-persistent CSI-RS resource set corresponding to the SP CSI-RS resource set ID i is deactivated. Optionally, when Ci is set to 0, it may further indicate that all semi-persistent CSI-RS resource sets on the corresponding cell are deactivated.

(3) Resource set ID i TCI state ID indicates the resource set TCI state field, and indicates a TCI state of a CSI-RS resource in a semi-persistent CSI-RS resource set. This field includes a TCI state index TCI-StateId of the semi-persistent CSI-RS resource set, and serves as a quasi-colocation (QCL) source of resources in the semi-persistent NZP CSI-RS resource set indicated by the semi-persistent CSI-RS resource set ID i. TCI State ID 0 indicates a TCI state of the $1^{st}$ resource in the SP CSI-RS resource set. Because a semi-persistent CSI-RS resource set includes at least one semi-persistent CSI-RS resource, TCI ID 0 definitely exists. When a semi-persistent CSI-RS resource set includes more semi-persistent CSI-RS resources, the MAC CE signaling may further include TCI State ID 1 of the $2^{nd}$ resource, and so on. A length of each TCI State ID in this field is 7 bits (a maximum of 128 TCI states are supported). If the Ci field is set to 0, an octet including the TCI State ID 0 field may not exist.

(4) R (reserved) indicates the reserved field, indicates a reserved bit, and is set to 0.

A CSI-RS resource is configured for a specific BWP on a specific cell, that is, a CSI-RS resource is associated with a BWP on a specific cell. A CSI-RS resource indicated by a MAC CE or DCI is also associated with a specific downlink BWP. To specify information about a BWP associated with a CSI-RS resource, BWP index (BWP ID) information (not shown in the figure) may be included in indication information. To simplify indication information in a cell activation process, BWP indication information may be simplified, that is, indication is performed through association between a CSI-RS and a default BWP. The default BWP associated with the CSI-RS is a default downlink BWP, and may be a BWP corresponding to a first active DL BWP ID in an RRC configuration, or may be a BWP corresponding to a smallest or largest BWP ID among configured default downlink BWP IDs. In this example, a CSI-RS resource in the indication information may be understood as the CSI-RS resource associated with the default BWP.

Based on this MAC CE structure, the secondary cell indication field is used to carry the first indication information, and the semi-persistent CSI-RS resource set field is used to carry the second indication information.

According to this implementation method, in an aspect, the network device may combine the first indication information and the second indication information in one piece of MAC CE signaling. Therefore, a process of using a semi-persistent CSI-RS resource in an activation process of a secondary cell can be simplified, thereby reducing an activation delay of the SCell. In another aspect, with the method, a semi-persistent CSI-RS resource can be used in an activation process of an SCell. An active state and a deactivated state of the semi-persistent CSI-RS resource may be set by using MAC CE signaling. Therefore, with the method, the secondary cell can be flexibly activated and deactivated, thereby improving utilization of an air interface resource, and also improving utilization of the semi-persistent CSI-RS resource.

Implementation Method 2

For example, as shown in FIG. 3, an SCell 1 is the to-be-activated first secondary cell, the first semi-persistent CSI-RS resource is a resource on a DL SCC, and the first semi-persistent CSI report resource is a resource on a UL PCC. After receiving an activation command for the SCell 1, the terminal device performs CSI measurement by using the first semi-persistent CSI-RS resource on the DL SCC of the SCell 1. Then the terminal device sends a CSI report by using the first semi-persistent CSI report resource on the UL PCC of a PCell.

In a possible example, in step 201, the first information sent by the network device to the terminal device is carried in MAC CE signaling, and the MAC CE signaling includes the first indication information, the second indication information, and the third indication information.

A MAC CE structure is shown in FIG. 5A. In FIG. 5A, information fields in a MAC CE further include a semi-persistent CSI report configuration field, in addition to the secondary cell indication field, the semi-persistent CSI-RS resource set field, the resource set TCI state field, and the reserved field in FIG. 4. For the secondary cell indication field, the semi-persistent CSI-RS resource set field, the resource set TCI state field, and the reserved field in FIG. 5A, refer to the descriptions of FIG. 4. Details are not described herein again.

Serving Cell ID indicates a PCell or an SCell with a serving cell index, and the cell is an activated cell that can be used to send a CSI report. For example, Serving Cell ID may alternatively not be included, and a CSI report is sent by default by using a cell to which a current uplink PUCCH belongs.

Sj indicates a semi-persistent CSI report configuration field of the cell indicated by Serving Cell ID. This field indicates an activation/deactivation status of a semi-persistent CSI report configuration in CSI-ReportConfigToAddModList (CSI report configuration to add mode list) of the PCell or the SCell with a serving cell index that is indicated by Serving Cell ID. So indicates a report configuration that is used to indicate an SP CSI report PUCCH resource in a specific BWP and that has a smallest CSI-ReportConfigId (CSI-report configuration ID) in a list of report configurations set to a semiPersistentOnPUCCH (semi-persistent on PUCCH) type. Si indicates a report configuration that is used to indicate an SP CSI report PUCCH resource in the specific BWP and that has a second smallest CSI-ReportConfigId. If the list includes fewer than j+1 report configurations set to the semiPersistentOnPUCCH type in the specific BWP, a MAC entity ignores the Sj field. If the Sj field is set to 1, it is used to indicate that a corresponding semi-persistent CSI report configuration is to be activated. If the Sj field is set to 0, it is used to indicate that a corresponding semi-persistent CSI report configuration j is to be deactivated.

A CSI-RS resource is configured for a specific BWP on a specific cell, that is, a CSI-RS resource is associated with a BWP on a specific cell. A CSI-RS resource indicated by a MAC CE or DCI is also associated with a specific downlink BWP. To specify information about a BWP associated with a CSI-RS resource, BWP index (BWP ID) information (not shown in the figure) may be included in indication information. To simplify indication information in a cell activation process, BWP indication information may be simplified, that is, indication is performed through association between a CSI-RS and a default BWP. The default BWP associated with the CSI-RS is a default downlink BWP, and may be a BWP corresponding to a first active DL BWP ID in an RRC configuration, or may be a BWP corresponding to a smallest or largest BWP ID among configured default downlink BWP IDs. In this example, a CSI-RS resource in the indication information may be understood as the CSI-RS resource associated with the default BWP. A CSI report resource is configured for a specific BWP on a specific cell, that is, a CSI report resource is associated with a BWP on a specific cell. A CSI report resource indicated by a MAC CE or DCI is also associated with a specific uplink BWP. To specify information about a BWP associated with a CSI report resource, BWP index (BWP ID) information may be included in indication information. To simplify indication information in a cell activation process, BWP indication information may be simplified, that is, indication is performed through association between a CSI report resource and a default BWP. The default BWP associated with the CSI report resource is a default uplink BWP. The specific uplink BWP may be an uplink BWP indicated by the BWP ID in the MAC CE, or may be a BWP corresponding to a first active UL BWP ID in an RRC configuration, or may be a BWP corresponding to a smallest or largest BWP ID configured on the cell indicated by Serving Cell ID, or may be a currently active uplink BWP on the cell indicated by Serving Cell ID (including the default cell to which the current uplink PUCCH belongs).

Based on this MAC CE structure, the secondary cell indication field is used to carry the first indication information, the semi-persistent CSI-RS resource set field is used to carry the second indication information, and the semi-persistent CSI report configuration field is used to carry the third indication information.

According to this implementation method, in an aspect, the network device may combine the first indication information, the second indication information, and the third indication information in one piece of MAC CE signaling. Therefore, a process of using a semi-persistent CSI-RS resource and a semi-persistent CSI report resource in a cell activation process can be simplified, thereby reducing an activation delay of an SCell. In another aspect, with the method, a semi-persistent CSI-RS resource and a semi-persistent CSI report resource can be used in an activation process of an SCell. An active state and a deactivated state of the semi-persistent CSI-RS resource and the semi-persistent CSI report resource may be set by using MAC CE signaling. Therefore, with the method, the secondary cell can be flexibly activated and deactivated, thereby improving utilization of an air interface resource.

Implementation Method 3

In a possible example, in step 201, the first information sent by the network device to the terminal device is carried in DCI, and the DCI may include the first indication information, or the DCI may include the first indication information and the second indication information, or the DCI includes the first indication information, the second indication information, and the third indication information.

Example 1: The network device may use a newly designed DCI format to carry the first information, for example, a DCI format 3_x.

Example 2: The network device may reuse an existing DCI format to carry the first information, for example, a DCI format 1_0.

For example 1 and example 2, a first specific implementation method is as follows: The network device may transmit the first information by using a new RNTI-scrambled CRC encoded in a DCI format, new RNTI-scrambled DCI for short. For example, the network device may add the first information to DCI, in the existing DCI format 1_0, that is scrambled by using a secondary cell activation RNTI (SCAct-RNTI). In addition, the network device may alternatively reuse an existing DCI format 1_1, DCI format 0_1, or DCI format 0_0 to carry the first information.

In a possible embodiment, the new SCAct-RNTI may alternatively not be introduced to scramble the DCI information, but an existing RNTI such as a C-RNTI is used to scramble the DCI information.

A second specific implementation method is as follows: The network device may use an information field in a DCI structure to indicate that DCI includes the first information.

For example, an authentication field of the DCI information may be obtained by combining special values (all "0s" or all "1s") of one or more of the following information fields: a HARQ process number or a redundancy version (RV), a modulation and coding scheme (MCS), a time domain resource assignment (TDRA), a new data indicator (NDI), a transmit power control indication field (which may be TPC for a PUSCH or TPC for a PUCCH), a frequency hopping (Frequency Hopping Flag) indication field, or an FDRA. In addition, the DCI information may alternatively be authenticated by using a combination of other fields not including the FDRA field.

A third specific implementation method is as follows: The network device may use the first specific implementation method and the second specific implementation method in combination.

In an aspect, for the first specific implementation method, the network device may use new RNTI-scrambled DCI, and an encoding process is as follows (essentially, a CRC obtained by encoding information in DCI based on a specific format is scrambled by using an RNTI).

(1) Control information constitutes a control information block, or referred to as a control information sequence, based on a specific format (a DCI format), for example, $a_0$, $a_1$, $a_2$, $a_3$, . . . , $a_{A-1}$.

(2) CRC check information $p_0$, $p_1$, $p_2$, $p_3$, . . . , $p_{L-1}$ is generated based on the control information block $a_0$, $a_1$, $a_2$, $a_3$, . . . , $a_{A-1}$, and the CRC check information is added to the control information block to generate the following information: $b_0$, $b_1$, $b_2$, $b_3$, . . . , $b_{K-1}$, where $b_k = a_k$ for $k=0,1,2, \ldots ,A-1$;

$b_k = p_{k-A}$ for $k=A,A+1,A+2, \ldots ,A+L-1$; and $K=A+L$.

(3) After the CRC check information is added to the control information block, the CRC check information is scrambled by using a corresponding RNTI (16 bits) $x_{rnti,0}$, $x_{rnti,1}$, . . . , $x_{rnti,15}$ to generate an information sequence $c_0$, $c_1$, $c_2$, $c_3$, . . . , $c_{K-1}$. Specifically, the following operation is performed:

$c_k = b_k$ for $k=0,1,2, \ldots ,A+7$; and $c_k = (b_k + x_{rnti,k-A-8}) \mod 2$ for $k=A+8,A+9,A+10, \ldots ,A+23$.

(4) Then channel encoding and rate matching are performed to complete an encoding process of the control information.

In another aspect, for the second specific implementation method, a DCI structure is shown in Table 1. For a secondary cell indication field, a semi-persistent CSI-RS resource set field, a resource set TCI state field, and a semi-persistent CSI report configuration field in Table 1, refer to specific descriptions of FIG. 4 and FIG. 5A. Details are not described herein again.

The DCI structure is shown in Table 1. In Table 1, information fields in DCI include a secondary cell indication field, a semi-persistent CSI-RS resource set field, a resource set TCI state field, and a semi-persistent CSI report configuration field. For the secondary cell indication field, the semi-persistent CSI-RS resource set field, the resource set TCI state field, and the semi-persistent CSI report configuration field in Table 1, refer to specific descriptions of FIG. 4 and FIG. 5A. Details are not described herein again.

TABLE 1

| Information Field | Representation Symbol | Length | Description |
|---|---|---|---|
| DCI format | Identifier for DCI formats | 1 | Downlink control information indication |
| Frequency resource field | Frequency domain resource assignment (FDRA) | Variable | Frequency resource indication information |
| Secondary cell indication field | SCellIndBitmap | 16 | This field indicates an index of an SCell cell to be activated or deactivated. |
| Semi-persistent CSI-RS resource set field | SP-CSI RS resource set ID for SCell i | 0 or 6 per SCell (A minimum length for each secondary cell is 0, and a maximum length is 6.) | When the length is 0, it indicates that a default ID is used for activation/deactivation in a simplified manner. |
| Frequency resource field | Frequency domain resource assignment (FDRA) | Variable | When the FDRA is not all "1s", this field is used to indicate a frequency resource. When the FDRA is all "1s", this field is used to indicate that the downlink control information is the first control information. |
| Resource set TCI state field | TCI states ID for the first SP-CSI RS resource in set ID for SCell i | 0 or 7 per SCell (A minimum length for each secondary cell is 0, and a maximum length is 7.) | When the length is 0, it indicates that a default ID is used for activation/deactivation in a simplified manner. |
| Serving cell field | Serving Cell ID | 0 or 5 | 0 indicates that a default cell to which a current PUCCH belongs is used. |
| Bandwidth part field | BWP ID | 0 or 2 | 0 indicates that a default BWP ID is used in a simplified manner. |
| Semi-persistent CSI report configuration field | SP-CSI report ID | 0 or 4 per SCell (A minimum length for each secondary cell is 0, and a maximum length is 4.) | When the length is 0, it indicates that a default ID is used for activation/deactivation in a simplified manner. |

In Table 1, for example, when the FDRA is not all "is", the FDRA field is used to indicate a frequency resource; or when the FDRA is all "is", the FDRA field is used to indicate that the downlink control information is the first control information.

In a possible embodiment, considering that a quantity of information bits in the DCI format is limited, in this embodiment of this application, content in the DCI for carrying the first information may be simplified in the following manners.

Manner 1: A quantity of ID indications in a DCI overload may be reduced.

For example, six bits in existing DCI need to be occupied to carry a CSI-RS resource indicated by any one of 64 semi-persistent CSI-RS resource set IDs. In this implementation, only one bit in DCI may be occupied to carry a semi-persistent CSI-RS resource set corresponding to one or two smallest IDs (smallest one or two IDs). To be specific, the DCI includes only a semi-persistent CSI-RS resource set corresponding to a smallest CSI-RS resource set ID in a specific downlink BWP of a secondary cell indicated by the cell indication field, and a semi-persistent CSI-RS resource set corresponding to a second smallest CSI-RS resource set ID in the specific downlink BWP of the indicated secondary cell. Similarly, a TCI state ID corresponding to each CSI-RS resource set may also be simplified.

For another example, four bits in existing DCI need to be occupied to carry CSI report resources corresponding to four CSI report resource IDs. In this implementation, only one bit in DCI is occupied to carry a CSI report resource corresponding to smallest one or two CSI report resource IDs (smallest one or two IDs). To be specific, the DCI includes only a semi-persistent CSI report resource corresponding to a smallest CSI report resource ID in a specific downlink BWP of a secondary cell indicated by the cell indication field, and a CSI report resource corresponding to a second smallest CSI report resource ID in the specific downlink BWP of the indicated secondary cell.

Manner 2: Information corresponding to a default ID may be used. For example, six bits in existing DCI need to be occupied to carry a CSI-RS resource indicated by any one of 64 semi-persistent CSI-RS resource set IDs. In this implementation, DCI does not carry information corresponding to the semi-consistent CSI-RS resource set field, the resource set TCI state field, or the semi-consistent CSI report configuration field, that is, these information fields occupy 0 bits. Therefore, the DCI may include only information indicating a DCI format, the frequency resource indication information, and the first indication information.

Figure 5B:
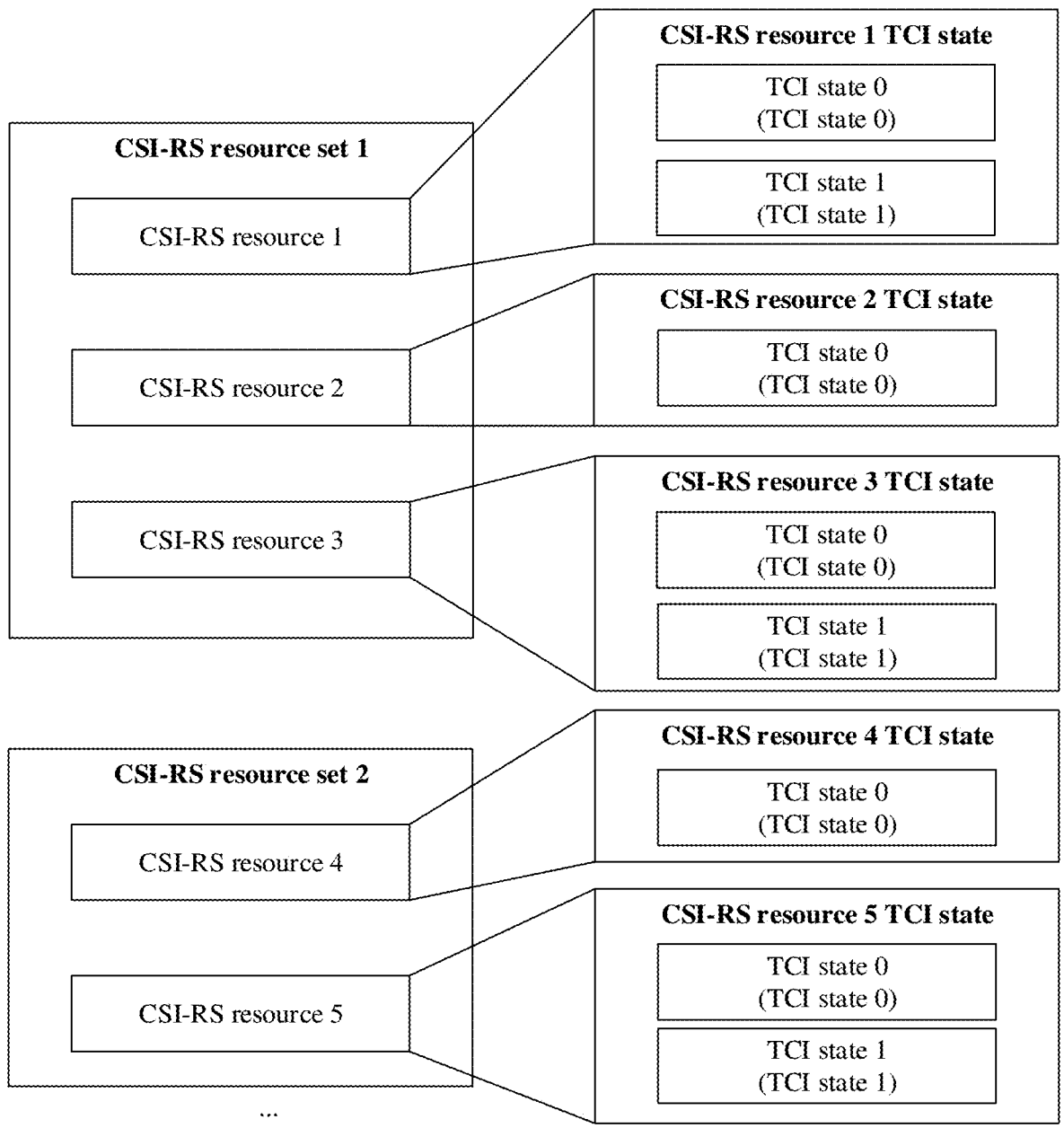
FIG. 5B and FIG. 5C are schematic diagrams of a CSI-RS resource and a CSI report resource according to an embodiment of this application.
Figure 5C:
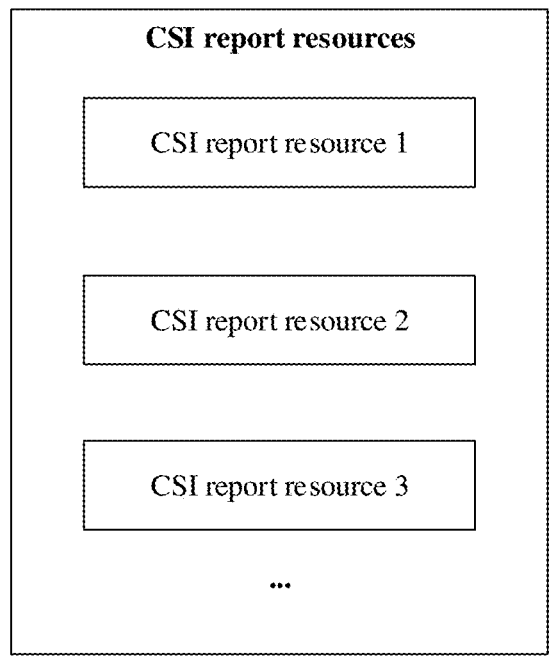

For example, FIG. 5B is a diagram of a relationship between a CSI-RS resource set, a CSI_RS resource, and a TCI state corresponding to a CSI-RS resource set. When a CSI-RS resource set corresponding to a smallest CSI-RS resource ID is used by default, and a TCI state corresponding to a smallest TCI state ID is used for each CSI-RS resource, the DCI does not need to include a CSI-RS resource set ID or a corresponding TCI state ID. The terminal device may determine, based on the default relationship, to perform CSI measurement by using a CSI-RS resource 1 in a CSI-RS resource set 1 and a TCI state 0 of the corresponding resource, a CSI-RS resource 2 in the CSI-RS resource set 1 and a TCI state 0 of the corresponding resource, and a CSI-RS resource 3 in the CSI-RS resource set 1 and a TCI state 0 of the corresponding resource. FIG. 5C shows a plurality of CSI report resources. When a CSI report resource corresponding to a smallest CSI report resource ID is used by default, the terminal device may determine, based on the default relationship, to perform corresponding CSI reporting by using a CSI report resource 1.

For example, in Manner 2, step 202 is specifically as follows: After receiving the DCI, the terminal device uses, on a specified cell by default, only a semi-persistent CSI-RS resource corresponding to a smallest BWP ID in an RRC configuration of a specific downlink BWP of a secondary cell indicated by the cell indication field, or only semi-persistent CSI-RS resources corresponding to a smallest BWP ID and a second smallest BWP ID in an RRC configuration. Step 203 is specifically as follows: After receiving the DCI, the terminal device uses, by default, only a semi-persistent CSI report resource corresponding to a smallest BWP ID in an RRC configuration, or only semi-persistent CSI report resources corresponding to a smallest BWP ID and a second smallest BWP ID in an RRC configuration.

In a possible embodiment, to avoid increasing a quantity of times of PDCCH blind detection by the terminal device, a total quantity of bits of the newly designed DCI format or a total quantity of bits of the reused DCI format needs to be the same as that of an original DCI format used for scheduling data. To be specific, when the first information is sent by using the DCI format 3_x, a size of the DCI format 3_x needs to be the same as that of the DCI format 1_0 or the DCI format 1_1 used for scheduling downlink data.

According to Implementation Method 3, in a first aspect, the network device may combine the first indication information, the second indication information, and the third indication information in one piece of DCI. Therefore, a process of using a semi-persistent CSI-RS resource in an activation process of a secondary cell can be simplified, thereby reducing an activation delay of the SCell. In a second aspect, with the method, a semi-persistent CSI-RS resource and a semi-persistent CSI report resource can be used in an activation process of an SCell. An active state and a deactivated state of the semi-persistent CSI-RS resource and the semi-persistent CSI report resource may be set by using DCI. Therefore, with the method, the secondary cell can be flexibly activated and deactivated, thereby improving utilization of an air interface resource. In a third aspect, a transmission delay of DCI is less than that of MAC CE signaling. Therefore, with this implementation method, an activation delay of a secondary cell can be reduced more effectively compared with Implementation Method 1 and Implementation Method 2.

In another possible embodiment, according to Implementation Method 3 and Implementation Method 4, when the first information is carried in DCI, the terminal device may further perform hybrid automatic repeat request (HARQ) feedback on the first information, that is, the terminal device sends a HARQ to the network device, where the HARQ is used to indicate whether the first information is correctly received, thereby improving transmission reliability of the DCI information.

Figure 6:
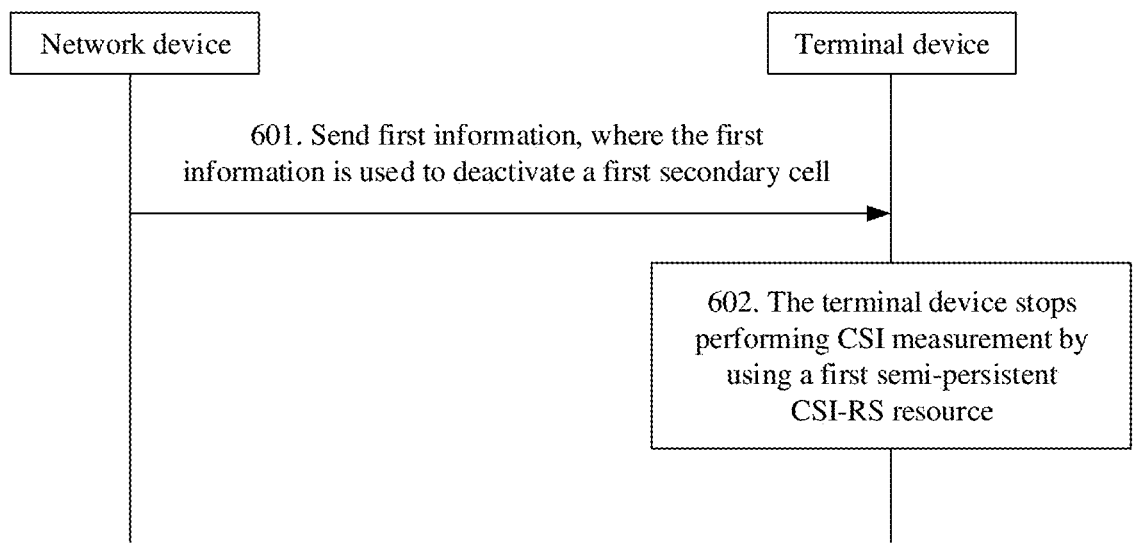
FIG. 6 is a schematic flowchart of another communication method according to an embodiment of this application.

As shown in FIG. 6, this application further provides a procedure of a communication method. The procedure is used to deactivate a secondary cell. In the procedure, a network device may correspond to the network device no in the procedure shown in FIG. 1A, and the terminal device may correspond to the terminal device 120 in the procedure shown in FIG. 1A. The procedure includes the following steps.

S601: The network device sends second information to the terminal device, where the second information is used to deactivate a first secondary cell.

The second information may be carried in control information. For example, the control information is MAC CE signaling or DCI. The MAC CE signaling or the DCI includes indication information that indicates to deactivate the first secondary cell.

S602: The terminal device stops performing CSI measurement by using a first semi-persistent CSI-RS resource.

For example, the terminal device may further perform a first operation on the first secondary cell, and the first operation may include at least one of the following:

skipping monitoring a PDCCH on the first secondary cell;
skipping monitoring or scheduling a PDCCH on the first secondary cell;
skipping transmitting an SRS on the first secondary cell;
skipping transmitting uplink data on the first secondary cell;
skipping transmitting an physical uplink control channel PUCCH on the first secondary cell;
stopping a deactivation timer of the first secondary cell; and
clearing a HARQ cache corresponding to the first secondary cell.

In the foregoing solution, the terminal device deactivates the first secondary cell based on the second information sent by the network device, to flexibly control an active state or a deactivated state of the secondary cell.

For example, the control information further includes a deactivation command for another secondary cell. A deactivation process of the another secondary cell is similar to the activation or deactivation process of the first secondary cell, and descriptions are not repeated.

The foregoing mainly describes the solutions provided in this application from a perspective of interaction between network elements. It may be understood that to implement the foregoing functions, each network element includes a corresponding hardware structure and/or software module for implementing each function. A person skilled in the art should be easily aware that, in combination with the units and algorithm steps in the examples described in the embodiments disclosed in this specification, the present invention can be implemented by using hardware or a combination of hardware and computer software. Whether a function is performed by using hardware or hardware driven by computer software depends on a particular application and a design constraint condition of the technical solutions. A person skilled in the art may use different methods to implement the described functions for each particular application, but it should not be considered that the implementation goes beyond the scope of the present invention.

It may be understood that the descriptions in FIG. 2 and FIG. 6 may be independently applied, combined, or referenced.

The communication methods in the embodiments of this application are described above in detail with reference to FIG. 2 and FIG. 6. Communications apparatuses in the embodiments of this application are described below in detail with reference to FIG. 7 to FIG. 9.

Figure 7:
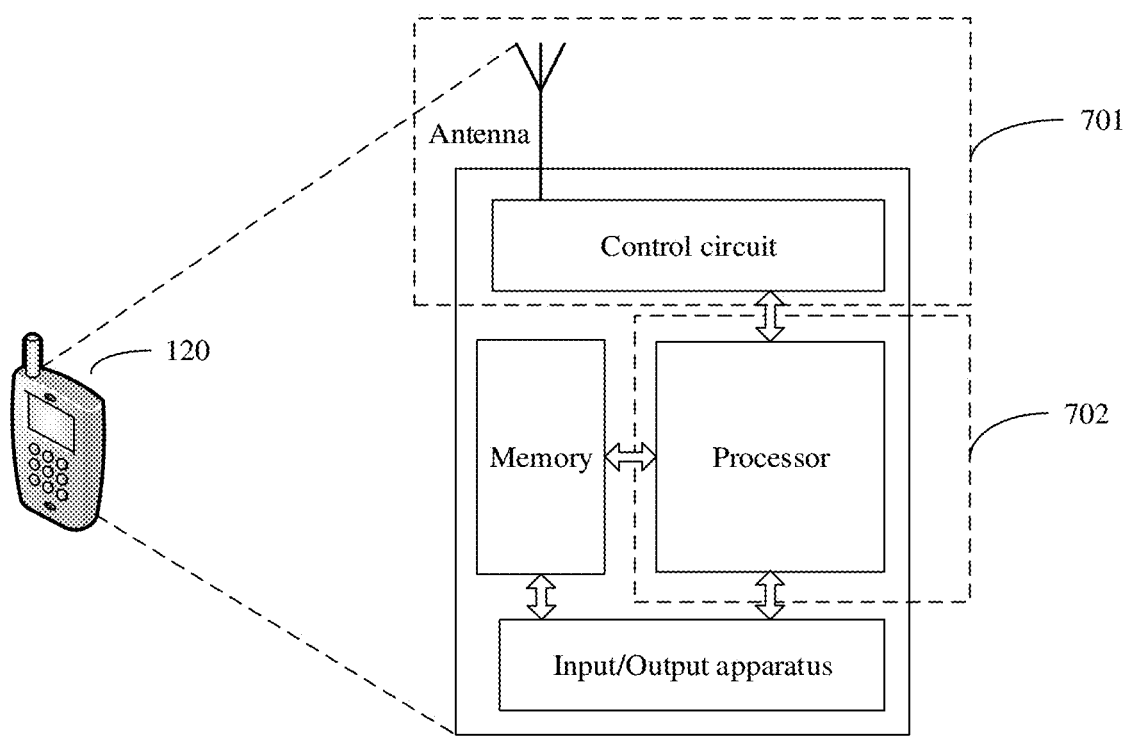
FIG. 7 is a schematic diagram of a structure of a terminal device according to an embodiment of this application.

FIG. 7 is a schematic diagram of a structure of a terminal device according to an embodiment of this application. The terminal device may be used in the system shown in FIG. 1A, and perform functions of the terminal device in the foregoing method embodiments. For ease of description, FIG. 7 shows only main components of the terminal device. As shown in FIG. 7, the terminal device 120 includes a processor, a memory, a control circuit, an antenna, and an input/output apparatus. The processor is mainly configured to process a communications protocol and communication data, control the entire terminal device, execute a software program, and process data of the software program. For example, the processor is configured to support the terminal device in performing an action described in the foregoing method embodiments, for example, determining a precoding matrix based on received PMI and RI, to precode a signal and send a precoded signal. The memory is mainly configured to store a software program and data, for example, store the foregoing correspondence between indication information and combination information in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to transmit and receive a radio frequency signal in a form of an electromagnetic wave. The input/output apparatus, such as a touchscreen, a display screen, and a keyboard, is mainly configured to receive data input by a user and output data to the user.

After the terminal device is powered on, the processor may read a software program in a storage unit, explain and execute instructions of the software program, and process data of the software program. When data needs to be sent in a wireless manner, the processor outputs a baseband signal to a radio frequency circuit after performing baseband processing on the to-be-sent data. After performing radio frequency processing on the baseband signal, the radio frequency circuit sends a radio frequency signal in a form of an electromagnetic wave through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 7 shows only one memory and only one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communications protocol and the communication data. The central processing unit is mainly configured to control the entire terminal device, execute the software program, and process the data of the software program. Functions of the baseband processor and the central processing unit may be integrated into the processor in FIG. 7. A person skilled in the art may understand that the baseband processor and the central processing unit each may be an independent processor, and are interconnected by using a technology such as a bus. A person skilled in the art can understand that the terminal device may include a plurality of baseband processors to adapt to different network standards, the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communications protocol and the communication data may be built in the processor, or may be stored in the storage unit in a form of a software program. The processor executes the software program to implement a baseband processing function.

In this embodiment of this application, the antenna and the control circuit that have a transceiver function may be considered as a transceiver unit 701 of the terminal device 120, for example, to support the terminal device in performing the receiving function and the sending function in FIG. 2. The processor having a processing function may be considered as a processing unit 702 of the terminal device 120. As shown in FIG. 7, the terminal device 120 includes a transceiver unit 701 and a processing unit 702. The transceiver unit may also be referred to as a transceiver, a transceiver, a transceiver apparatus, or the like. Optionally, a device configured to implement the receiving function in the transceiver unit 701 may be considered as a receiving unit, and a device configured to implement the sending function in the transceiver unit 701 may be considered as a sending unit. In other words, the transceiver unit 701 includes the receiving unit and the sending unit. The receiving unit may also be referred to as a receiver, an input port, a receiver circuit, or the like. The sending unit may be referred to as a transmitter, a transmitter, a transmitter circuit, or the like.

The processing unit 702 may be configured to execute instructions stored in the memory, to control the transceiver unit 701 to receive a signal and/or send a signal to complete a function of the terminal device in the foregoing method embodiments. In an implementation, a function of the transceiver unit 701 may be implemented by using a transceiver circuit or a dedicated transceiver chip.

Figure 8:
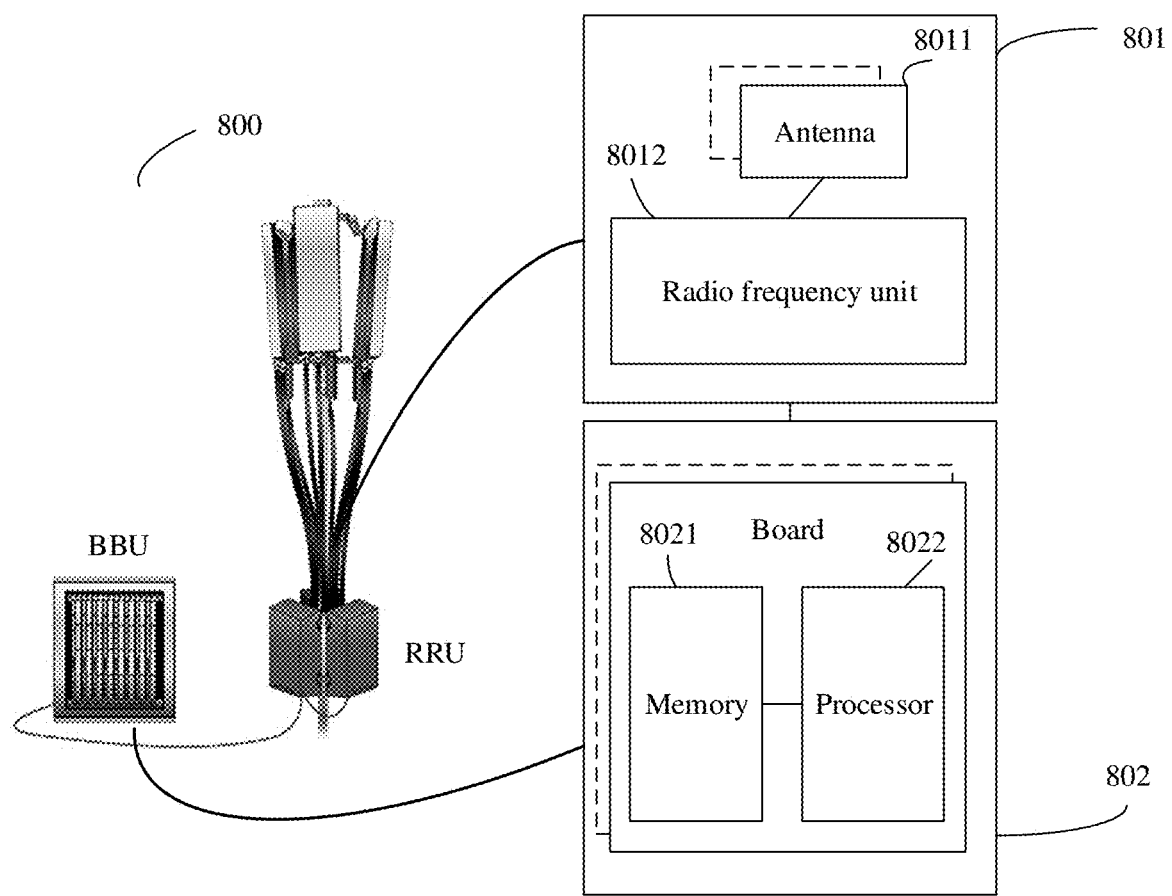
FIG. 8 is a schematic diagram of a structure of a network device according to an embodiment of this application.

FIG. 8 is a schematic diagram of a structure of a network device according to an embodiment of this application, for example, may be a schematic diagram of a structure of a base station. As shown in FIG. 8, the base station may be used in the system shown in FIG. 1A, to perform a function of the network device in the foregoing method embodiments. The base station 800 may include one or more radio frequency units, such as a remote radio unit (RRU) 801 and one or more baseband units (BBU) (which may also be referred to as a digital unit, DU) 802. The RRU 801 may be referred to as a transceiver unit, a transceiver, a transceiver circuit, a transceiver, or the like, and may include at least one antenna 8011 and a radio frequency unit 8012. The RRU 801 is mainly configured to: send and receive a radio frequency signal, and perform conversion between the radio frequency signal and a baseband signal, for example, configured to send the signaling message in the foregoing embodiments to a terminal device. The BBU 802 is mainly configured to: perform baseband processing, control the base station, and the like. The RRU 801 and the BBU 802 may be physically disposed together, or may be physically separated, that is, in a distributed base station.

The BBU 802, also referred to as a processing unit, is a control center of the base station, and is mainly configured to complete baseband processing functions such as channel coding, multiplexing, modulation, and spectrum spreading. For example, the BBU (the processing unit) 802 may be configured to control the base station to execute an operation procedure related to the network device in the foregoing method embodiments.

In an example, the BBU 802 may include one or more boards. A plurality of boards may jointly support a radio access network (such as an LTE network) of a single access standard, or may respectively support radio access networks (such as an LTE network, a 5G network, or another network) of different access standards. The BBU 802 further includes a memory 8021 and a processor 8022. The memory 8021 is configured to store necessary instructions and data. For example, the memory 8021 stores the correspondence between a codebook index and a precoding matrix in the foregoing embodiments. The processor 8022 is configured to control the base station to perform a necessary action, for example, is configured to control the base station to perform the operation procedure related to the network device in the foregoing method embodiments. The memory 8021 and the processor 8022 may serve one or more boards. In other words, a memory and a processor may be independently disposed on each board, or a plurality of boards may share a same memory and a same processor. In addition, a necessary circuit may be further disposed on each board.

Figure 9:
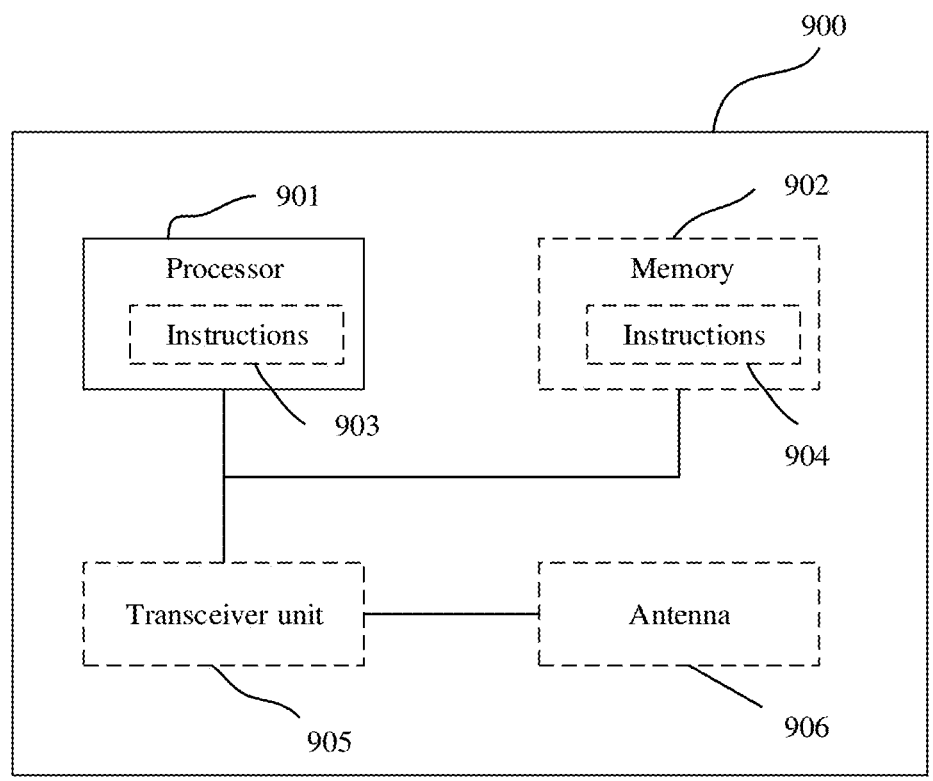
FIG. 9 is a schematic diagram of a structure of a communications apparatus according to an embodiment of this application.

FIG. 9 is a schematic diagram of a structure of a communications apparatus 900. The apparatus 900 may be configured to implement the methods described in the foregoing method embodiments. For details, refer to the description in the foregoing method embodiments. The communications apparatus 900 may be a chip, a network device (such as a base station), a terminal device, another network device, or the like.

The communications apparatus 900 includes one or more processors 901. The processor 901 may be a general purpose processor, a dedicated processor, or the like. For example, the processor may be a baseband processor or a central processing unit. The baseband processor may be configured to process a communications protocol and communication data. The central processing unit may be configured to control the communications apparatus (for example, a base station, a terminal, or a chip), execute a software program, and process data of the software program. The communications apparatus may include a transceiver unit that is configured to input (receive) and output (send) a signal. For example, the communications apparatus may be a chip, and the transceiver unit may be an input and/or output circuit or a communications interface of the chip. The chip may be used for a terminal, a base station, or another network device. For another example, the communications apparatus may be a terminal, a base station, or another network device, and the transceiver unit may be a transceiver, a radio frequency chip, or the like.

The communications apparatus 900 includes one or more processors 901. The one or more processors 901 may implement the method for the network device or the terminal device in the embodiment shown in FIG. 2.

In a possible design, the communications apparatus 900 includes a means for generating first indication information and a means for sending the first indication information. One or more processors may be used to implement functions of the means for generating the first indication information and the means for sending the first indication information. For example, the first indication information may be generated by using the one or more processors, and the first indication information may be sent by using the transceiver, the input/output circuit, or the interface of the chip. For the first indication information, refer to related descriptions in the foregoing method embodiments.

In a possible design, the communications apparatus 900 includes a means for receiving the first indication information and a means for determining the second parameter. For the first indication information and a method for determining the second parameter, refer to related descriptions in the foregoing method embodiments. For example, the first indication information may be received by using the transceiver, the input/output circuit, or the interface of the chip, and the second parameter may be determined by using the one or more processors.

Optionally, the processor 901 may further implement another function in addition to the method in the embodiment shown in FIG. 2.

Optionally, in a design, the processor 901 may further include instructions 903. The instructions may be run on the processor, so that the communications apparatus 900 performs the methods described in the foregoing method embodiments.

In still another possible design, the communications apparatus 900 may alternatively include a circuit. The circuit may implement a function of the network device or the terminal device in the foregoing method embodiments.

In still another possible design, the communications apparatus 900 may include one or more memories 902 that store instructions 904. The instructions may be run on the processor, so that the communications apparatus 900 performs the methods described in the foregoing method embodiments. Optionally, the memory may further store data. Optionally, the processor may also store instructions and/or data. For example, the one or more memories 902 may store a correspondence described in the foregoing embodiments, or the related parameter or table in the foregoing embodiments. The processor and the memory may be disposed separately, or may be integrated.

In still yet another possible design, the communications apparatus 900 may further include a transceiver unit 905 and an antenna 906. The processor 901 may be referred to as a processing unit, and controls the communications apparatus (the terminal or the base station). The transceiver unit 905 may be referred to as a transceiver, a transceiver circuit, a transceiver, or the like, and is configured to implement sending and receiving functions of the communications apparatus through the antenna 906.

This application further provides a communications system, including the foregoing one or more network devices and one or more terminal devices.

It should be understood that the processor in the embodiments of this application may be a central processing unit (CPU), or may be another general-purpose processor, a digital signal processor (DSP), an application specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a non-volatile memory, or may include the volatile memory and the non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by software, hardware (for example, a circuit), firmware, or any combination thereof. When the software is used to implement the embodiments, all or some of the foregoing embodiments may be implemented in a form of a computer program product. The computer program product includes one or more computer instructions or computer programs. When the program instructions or the computer programs are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that sequence numbers of the foregoing processes do not mean execution sequences in the embodiments of this application. The execution sequences of the processes should be determined based on functions and internal logic of the processes, and should not be construed as any limitation to the implementation processes of the embodiments of this application.

A person of ordinary skill in the art may be aware that, in combination with the units and algorithm steps in the examples described in the embodiments disclosed in this specification, this application can be implemented by electronic hardware or a combination of computer software and the electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

It may be clearly understood by the person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

Units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, the part contributing to the prior art, or some of the technical solutions may be implemented in a form of a software product. The computer software product is stored in a storage medium, and includes several instructions for enabling a computer device (which may be a personal computer, a server, or a network device) to perform all or some of the steps of the methods in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing description is merely a specific implementation of this application, but is not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication device, which is a terminal device or an apparatus included in the terminal device, comprising:
at least one processor, and
one or more non-transitory memories coupled to the at least one processor and storing programming instructions for execution by the at least one processor to perform operations comprising:
receiving first information, wherein the first information indicates to activate a first secondary cell;
determining a first semi-persistent channel state information (CSI) reference signal (CSI-RS) resource corresponding to a default index indicated by a length of a field in the first information; and
performing, in response to receiving the first information, CSI measurement by using the first semi-persistent CSI-RS resource in an activation process of the first secondary cell.

2. The device according to claim 1, wherein the first information is received from an external network device, the first information comprises first indication information and second indication information, the first indication information indicates to activate the first secondary cell, and the second indication information indicates to activate the first semi-persistent CSI-RS resource.

3. The device according to claim 2, wherein the first information further comprises third indication information, and the third indication information indicates to activate a first semi-persistent CSI report resource; and
the operations further comprise:
sending a CSI report on a primary cell using the first semi-persistent CSI report resource.

4. The device according to claim 3, wherein the first indication information, the second indication information, and the third indication information are carried in a same piece of first control information.

5. The device according to claim 4, wherein the first control information is downlink control information (DCI); and
the operations further comprise:
determining the first secondary cell corresponding to the first indication information;
determining the first semi-persistent CSI-RS resource corresponding to the second indication information; and
determining the first semi-persistent CSI report resource corresponding to the third indication information.

6. The device according to claim 1, wherein the first information is carried in downlink control information (DCI); and
the operations further comprise:
determining the first semi-persistent CSI-RS resource corresponding to the default index indicated by the length of the field in the DCI.

7. The device according to claim 6, wherein a DCI format of the DCI is a DCI format 1_0, the DCI further comprises an information field with a specified value, and the information field with the specified value is used to indicate that the DCI is used to activate the first secondary cell; and
a total quantity of bits of the DCI used to activate the first secondary cell is the same as a total quantity of bits of DCI in the DCI format 1_0 that is used to schedule downlink data.

8. The device according to claim 6, wherein the operations further comprise:
sending hybrid automatic repeat request (HARQ) information, wherein the HARQ information indicates whether the first information is correctly received.

9. The device according to claim 1, wherein the operations further comprise:
receiving second information, wherein the second information indicates to deactivate the first secondary cell; and
stopping performing the CSI measurement using the first semi-persistent CSI-RS resource.

10. A communication device, which is a network device or an apparatus included in the network device, comprising:
at least one processor, and
one or more non-transitory memories coupled to the at least one processor and storing programming instructions for execution by the at least one processor to perform operations comprising:
sending first information, wherein the first information indicates to activate a first secondary cell of a terminal device and activate a first semi-persistent channel state information (CSI) reference signal (CSI-RS) resource, wherein the first information comprises a field of a length, wherein the length associated with a default index corresponding to the first semi-persistent CSI-RS resource; and
receiving, in response to sending the first information, a CSI report of the first semi-persistent CSI-RS resource.

11. The device according to claim 10, wherein one of the network device or the apparatus sends the first information, the first information comprises first indication information and second indication information, the first indication information indicates to activate the first secondary cell, and the second indication information indicates to activate the first semi-persistent CSI-RS resource.

12. The device according to claim 11, wherein the first information further comprises third indication information, and the third indication information indicates to activate a first semi-persistent CSI report resource; and
the CSI report is received on a primary cell of the terminal device using the first semi-persistent CSI report resource.

13. The device according to claim 12, wherein the first indication information, the second indication information, and the third indication information are carried in a same piece of first control information.

14. The device according to claim 13, wherein the first secondary cell is determined by the terminal device based on the first indication information, the first semi-persistent CSI-RS resource is determined based on the second indication information, and the first semi-persistent CSI report resource is determined based on the third indication information.

15. The device according to claim 10, wherein the first information is carried in downlink control information (DCI), and the first semi-persistent CSI-RS resource is a semi-persistent CSI-RS resource corresponding to the default index indicated by the length of the field in the DCI.

16. The device according to claim 15, wherein a DCI format of the DCI is a DCI format 1_0, the DCI further comprises an information field with a specified value, and the information field with the specified value is used to indicate that the DCI is used to activate the first secondary cell; and
a total quantity of bits of the DCI used to activate the first secondary cell is the same as a total quantity of bits of DCI in the DCI format 1_0 that is used to schedule downlink data.

17. The device according to claim 15, wherein the operations further comprise:
  receiving hybrid automatic repeat request (HARQ) information, wherein the HARQ information indicates whether the first information is correctly received by the terminal device.

18. The device according to claim 10, wherein the operations further comprise:
  sending second information, wherein the second information indicates to deactivate the first secondary cell.

* * * * *

UNITED STATES PATENT AND TRADEMARK OFFICE
CERTIFICATE OF CORRECTION

PATENT NO. : 12,213,164 B2  
APPLICATION NO. : 17/651181  
DATED : January 28, 2025  
INVENTOR(S) : Xiao et al.

Page 1 of 1

It is certified that error appears in the above-identified patent and that said Letters Patent is hereby corrected as shown below:

On the Title Page

Item [54], in Column 1, Line 1, delete "DEVICE" and insert -- DEVICES --.

In the Specification

In Column 1, Line 1, delete "DEVICE" and insert -- DEVICES --.

Signed and Sealed this  
Eleventh Day of March, 2025

Coke Morgan Stewart  
*Acting Director of the United States Patent and Trademark Office*